United States Patent
Wu et al.

(10) Patent No.: US 10,925,017 B2
(45) Date of Patent: Feb. 16, 2021

(54) DATA TRANSMISSION METHOD AND SYSTEM

(71) Applicant: Huawei Technologies Co., Ltd., Shenzhen (CN)

(72) Inventors: Ning Wu, Shanghai (TW); Zhongfeng Li, Munich (DE); Xinxian Li, Shanghai (CN); Yi Qin, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/265,654

(22) Filed: Feb. 1, 2019

(65) Prior Publication Data

US 2019/0166569 A1    May 30, 2019

Related U.S. Application Data

(63) Continuation of application No. PCT/CN2017/096651, filed on Aug. 9, 2017.

(30) Foreign Application Priority Data

Aug. 11, 2016  (CN) .......................... 201610665453.5

(51) Int. Cl.
*H04W 56/00* (2009.01)
*H04L 12/24* (2006.01)
*H04W 72/04* (2009.01)
*H04L 5/00* (2006.01)
*H04J 11/00* (2006.01)

(52) U.S. Cl.
CPC ........ *H04W 56/001* (2013.01); *H04J 11/0069* (2013.01); *H04L 5/0007* (2013.01); *H04L 41/0803* (2013.01); *H04W 72/04* (2013.01); *H04L 5/0048* (2013.01)

(58) Field of Classification Search
CPC .......................... H04J 11/0069; H04L 41/0803; H04L 5/0007; H04L 5/0048; H04W 56/001; H04W 72/04
See application file for complete search history.

(56) References Cited

U.S. PATENT DOCUMENTS 10,548,129 B2 *  1/2020  Fwu ................... H04W 72/044
2008/0205351 A1  8/2008  Lindoff et al.
(Continued)

FOREIGN PATENT DOCUMENTS

CN         105191195 A    12/2015
WO         2014065563 A1   5/2014
(Continued)

OTHER PUBLICATIONS

Ericsson, "Synchronization Signals for 7.5 kHz Subcarrier Spacing," TSG-RAN QG1 #48bis, R1-071582, Mar. 26-30, 2007, 1 page.
(Continued)

*Primary Examiner* — Brian D Nguyen
(74) *Attorney, Agent, or Firm* — Slater Matsil, LLP

(57) ABSTRACT

A method is based on data transmission in a multi-parameter system, where a plurality of parameters include a subcarrier spacing. The method includes: sending, by the multi-parameter system, data over a physical channel or a physical signal by using at least one subcarrier spacing.

20 Claims, 14 Drawing Sheets

(56) References Cited

U.S. PATENT DOCUMENTS

| | | | |
|---|---|---|---|
| 2015/0055616 A1* | 2/2015 | Kim | H04W 56/00 |
| | | | 370/330 |
| 2015/0282178 A1 | 10/2015 | Kim et al. | |
| 2016/0249355 A1* | 8/2016 | Chae | H04W 72/1263 |
| 2017/0332383 A1 | 11/2017 | Frenger et al. | |
| 2018/0084486 A1* | 3/2018 | Pradas | H04W 24/10 |
| 2018/0091249 A1* | 3/2018 | Han | H04J 11/0076 |
| 2018/0191473 A1* | 7/2018 | Ashraf | H04L 5/0007 |
| 2018/0199341 A1* | 7/2018 | Baldemair | H04L 27/264 |
| 2018/0213468 A1* | 7/2018 | Chatterjee | H04W 48/10 |
| 2018/0294859 A1* | 10/2018 | Niu | H04J 11/00 |
| 2018/0302900 A1* | 10/2018 | Ibars Casas | H04W 72/0413 |
| 2018/0332602 A1* | 11/2018 | Lee | H04W 4/44 |
| 2019/0098650 A1* | 3/2019 | Tang | H04L 5/0051 |
| 2019/0149257 A1* | 5/2019 | Jiang | H04L 27/2602 |
| | | | 370/342 |

FOREIGN PATENT DOCUMENTS

| | | |
|---|---|---|
| WO | 2015131827 A1 | 9/2015 |
| WO | 2016040290 A1 | 3/2016 |

OTHER PUBLICATIONS

Takeda, Kazuaki., "Study on New Radio Access Technology," 3GPP TSG RAN Meeting #72, RP-161304, Jun. 13-16, 2016, 58 pages, Busan, Korea.

Huawei et al., "Analysis and Comparison on Numerology Candidates", 3GPP TSG RAN WG1 Meeting #85, R1-164031,Nanjing, China, May 23-27, 2016, 6 pages.

LG Electronics et al., "WF on Supporting Different Numerologies in a NR Carrier," 3GPP TSG RAN WG1 Meeting #85, R1-166008, May 23-27, 2016, 3 pages, Nanjing, China.

ZTE et al., "Frequency Multiplexing of Different Numerologies," 3GPP TSG RAN WG1 Meeting #85, R1-164273, May 23-27, 2016, 10 pages, Nanjing, China.

Qualcomm Incorporated, "Initial DL KPI Evaluation for eMBB," 3GPP TSG RAN WG1 #85, R1-164675, May 23-27, 2016, 9 pages, Nanjing, China.

* cited by examiner

| Location 0 of an SSS (in a $0^{th}$ subframe at a current time) | Location 2 of an SSS (in a $2^{th}$ subframe at a current time) |
|---|---|
| PSS | Location 3 of an SSS (in a $3^{rd}$ subframe at a current time) |
| Location 1 of an SSS (in a $1^{th}$ subframe at a current time) | Location 4 of an SSS (in a $4^{th}$ subframe at a current time) |

FIG. 8

DATA TRANSMISSION METHOD AND SYSTEM

CROSS-REFERENCE TO RELATED APPLICATIONS

This application is a continuation of International Application No. PCT/CN2017/096651, filed on Aug. 9, 2017, which claims priority to Chinese Patent Application No. 201610665453.5, filed on Aug. 11, 2016. The disclosures of the aforementioned applications are hereby incorporated by reference in their entireties.

TECHNICAL FIELD

The present invention relates to the field of wireless communications, and in particular, to a data transmission method and a system.

BACKGROUND

A 5th-generation (5G) mobile communications technology aims to provide a flexible system that can adapt to various service requirements, providing a technical foundation for future vertical services and industrial applications. From an air interface to a network, an entire network will be more flexible and efficient. For example, to better meet growing demands for service types, various service types such as eMBB, URLLC, mMTC, and broadcast need to be supported in a new access technology (such as a 5G technology). Since service characteristics, reliability requirements, and latency requirements of the service types are all different to some extent, requirements of system parameters such as a subcarrier spacing, a CP length, a symbol length, and a time unit length are different for services. For example, a carrier frequency range that can be supported in a 5G communications system extends from below 6 GHz to 70 GHz or higher. Doppler shifts and phase noises generated by different carrier frequencies also generate greatly different effects on the system. Usually, a larger carrier frequency indicates a greater subcarrier spacing required. Therefore, in the 5G communications system, to effectively support diversity of services, diversity of scenarios, and diversity of spectra, designs in which more subcarrier spacings are supported and a same parameter/different parameters can be supported at different frequencies are provided.

However, in the current system, service data transmission of each service type is performed by using a fixed subcarrier spacing at a fixed frequency, limiting service data transmission of different service types to some extent.

SUMMARY

The present invention provides a data transmission method and a system. The method is based on data transmission in a multi-parameter system, and supports data transmission by using one or more subcarrier spacings at a same frequency or different frequencies. In this way, requirements of service types are satisfied, and diversity and flexibility of service data transmission are improved.

According to a first aspect, embodiments of the present invention provide a data transmission method. The method includes based on data transmission in a multi-parameter system, where a multi-parameter includes a subcarrier spacing transmitting, by the multi-parameter system, data over a physical channel or a physical signal by using at least one subcarrier spacing.

In the data transmission method and the system provided by embodiments of the present invention, based on data transmission in the multi-parameter system, data is transmitted over the physical channel or the physical signal by using one or more subcarrier spacings at a same frequency or different frequencies, improving diversity and flexibility of service data transmission, and improving coordination of parameters in the multi-parameter system.

With reference to the first aspect, in a first possible implementation of the first aspect, before the transmitting, by the multi-parameter system, data over a physical channel or a physical signal by using at least one subcarrier spacing, the method further includes: configuring the physical channel or the physical signal in the multi-parameter system, configuring the data transmitted over the physical channel or the physical signal, and configuring a resource to which the data is mapped.

With reference to the first aspect or the first possible implementation of the first aspect, in a second possible implementation of the first aspect, the configuring the physical signal in the multi-parameter system includes configuring a synchronization signal.

With reference to the second possible implementation of the first aspect, in a third possible implementation of the first aspect, the configuring a synchronization signal includes configuring at least one synchronization signal and at least one subcarrier spacing that is used when a first sequence is transmitted over each synchronization signal.

With reference to the third possible implementation of the first aspect, in a fourth possible implementation of the first aspect, the at least one synchronization signal and the subcarrier spacing that is used when the first sequence is transmitted over each synchronization signal are configured based on a carrier frequency or a service type.

With reference to the third possible implementation of the first aspect or the fourth possible implementation of the first aspect, in a fifth possible implementation of the first aspect, a quantity of the at least one synchronization signal is configured to be equal to a quantity of the at least one subcarrier spacing supported by the multi-parameter system, where each synchronization signal supports transmitting data by using one of the subcarrier spacings.

With reference to the third possible implementation of the first aspect or the fourth possible implementation of the first aspect, in a sixth possible implementation of the first aspect, the configuring a synchronization signal further includes configuring a quantity of the at least one synchronization signal to be less than a quantity of the at least one subcarrier spacing supported by the multi-parameter system, where each synchronization signal supports transmitting data by using the at least one subcarrier spacing.

With reference to the first possible implementation of the first aspect, in a seventh possible implementation of the first aspect, the configuring the data transmitted over the physical signal includes determining a first sequence transmitted over a synchronization signal.

With reference to the seventh possible implementation of the first aspect, in an eighth possible implementation of the first aspect, the determining a first sequence transmitted over a synchronization signal includes determining the first sequence based on one or more types of information: an identifier of the synchronization signal, the subcarrier spacing, or a carrier frequency.

With reference to the first possible implementation of the first aspect, the seventh possible implementation of the first aspect, or the eighth possible implementation of the first aspect, in a ninth possible implementation of the first aspect, the configuring a resource to which the data is mapped includes determining a location of a resource to which the first sequence is mapped.

With reference to the ninth possible implementation of the first aspect, in a tenth possible implementation of the first aspect, the determining a location of a resource to which the first sequence is mapped includes determining, based on one or more types of information of configurations of: the identifier of the synchronization signal, the subcarrier spacing, or the carrier frequency, at least one of a plurality of optional locations to which the first sequence is mapped.

With reference to the ninth possible implementation of the first aspect or the tenth possible implementation of the first aspect, in an eleventh possible implementation of the first aspect, a frequency domain location includes a resource block location and a subcarrier location to which the first sequence is mapped when the first sequence is transmitted over the synchronization signal by using the at least one subcarrier spacing; and a time domain location includes a time unit to which the first sequence is mapped when the first sequence is transmitted over the synchronization signal by using the at least one subcarrier spacing, where the time unit includes a first time unit, a second time unit, and a third time unit.

With reference to the ninth possible implementation of the first aspect, the tenth possible implementation of the first aspect, or the eleventh possible implementation of the first aspect, in a twelfth possible implementation of the first aspect, a mapping relationship between the time unit to which the synchronization signal is mapped and the synchronization signal, a mapping relationship between the resource block location to which the synchronization signal is mapped and the synchronization signal, and a mapping relationship between the subcarrier spacing location to which the synchronization signal is mapped and the synchronization signal are configured.

With reference to the first possible implementation of the first aspect, in a thirteenth possible implementation of the first aspect, the configuring the physical signal in the multi-parameter system includes configuring a reference signal in the multi-parameter system.

With reference to the thirteenth possible implementation of the first aspect, in a fourteenth possible implementation of the first aspect, a second sequence is configured based on the subcarrier spacing, where the second sequence is a sequence transmitted over the reference signal by using the at least one subcarrier spacing.

With reference to the first aspect or the first possible implementation of the first aspect, in a fifteenth possible implementation of the first aspect, the method further includes: configuring a precoding granularity of the physical channel in the multi-parameter system based on the subcarrier spacing or a carrier frequency.

With reference to the fifteenth possible implementation of the first aspect, in a sixteenth possible implementation of the first aspect, the method includes: the configuring a precoding granularity of the physical channel in the multi-parameter system based on the subcarrier spacing or a carrier frequency includes predefining, by using the multi-parameter system, or configuring, by using signaling, the precoding granularity of the physical channel. The signaling includes a broadcast message, a Media Access Control control element, or a physical layer control channel.

According to a second aspect, embodiments of the present invention provide a system. The system includes a sending device and a receiving device, and the sending device and the receiving device support transmitting data over a physical channel or a physical signal by using a plurality of parameters. The plurality of parameters include a subcarrier spacing, and the sending device and the receiving device support transmitting data over the physical channel or the physical signal by using at least one subcarrier spacing.

In the data transmission method and the system provided by embodiments of the present invention, based on data transmission in the multi-parameter system, data is transmitted over the physical channel or the physical signal by using one or more subcarrier spacings at a same frequency or different frequencies, improving diversity and flexibility of service data transmission, and improving coordination of parameters in the multi-parameter system.

BRIEF DESCRIPTION OF THE DRAWINGS

The following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 8 is another schematic diagram of a resource location to which a synchronization signal is mapped according to an embodiment of the present invention;

FIG. 1*i*(b) is a schematic diagram of a resource block structure of another subcarrier spacing according to an embodiment of the present invention;

DETAILED DESCRIPTION OF ILLUSTRATIVE EMBODIMENTS

A data transmission method and a system provided by embodiments of the present invention are applicable to a system supporting transmitting data by using a plurality of parameters. The plurality of parameters may include parameter information such as a subcarrier spacing (SC), a cyclic prefix (CP) length, a time unit (such as a time interval (TTI), a radio frame, a subframe, or a symbol), and a resource block (RB) used when data is transmitted. The plurality of parameters can be applied to various physical channels or physical signals over which data is transmitted in a system, for example, a synchronization signal and a reference signal, or a data channel and a control channel. It should be noted that the synchronization signal may be alternatively referred to as a synchronization channel, or another name, for example, a discovery signal or a discovery channel. In the embodiments of the present invention, a sequence sent over the synchronization signal is referred to as a first sequence or a synchronization sequence.

It should be noted that the reference signal may be alternatively referred to as a pilot signal. In the embodiments of the present invention, a sequence sent over the reference signal is referred to as a second sequence or a reference sequence.

The data transmission method and the system provided by the embodiments of the present invention are mainly based on data transmission in the multi-parameter system, and transmitting data by using a plurality of different subcarrier spacings at a same frequency or different frequencies is further studied. A physical channel or a physical signal in a multi-parameter system is set, so that data transmission can be performed by coordinating a plurality of parameters in the multi-parameter system.

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
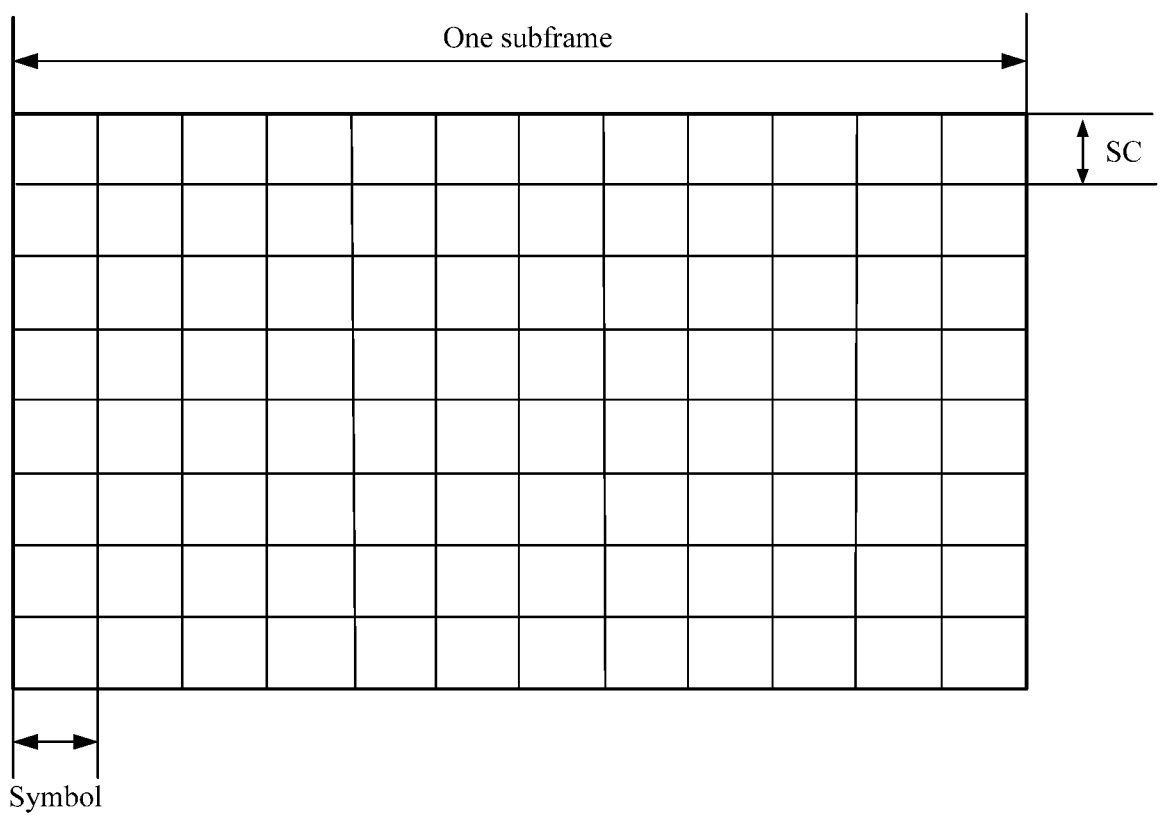
FIG. 1 is a schematic diagram of a resource structure in which data is transmitted by using a same subcarrier spacing according to an embodiment of the present invention.
Figure 2:
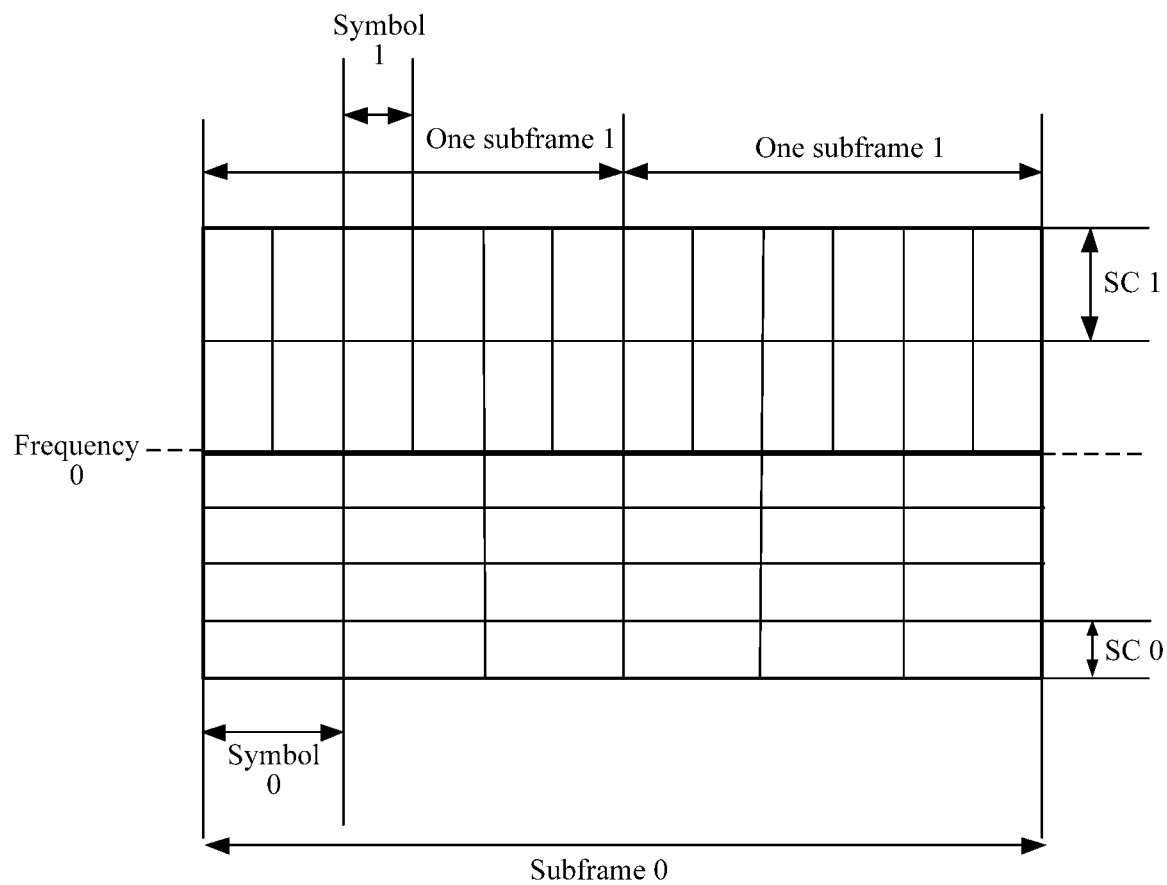
FIG. 2 is a schematic diagram of a resource structure in which data is transmitted by using a plurality of subcarrier spacings at a same frequency according to an embodiment of the present invention.
Figure 3:
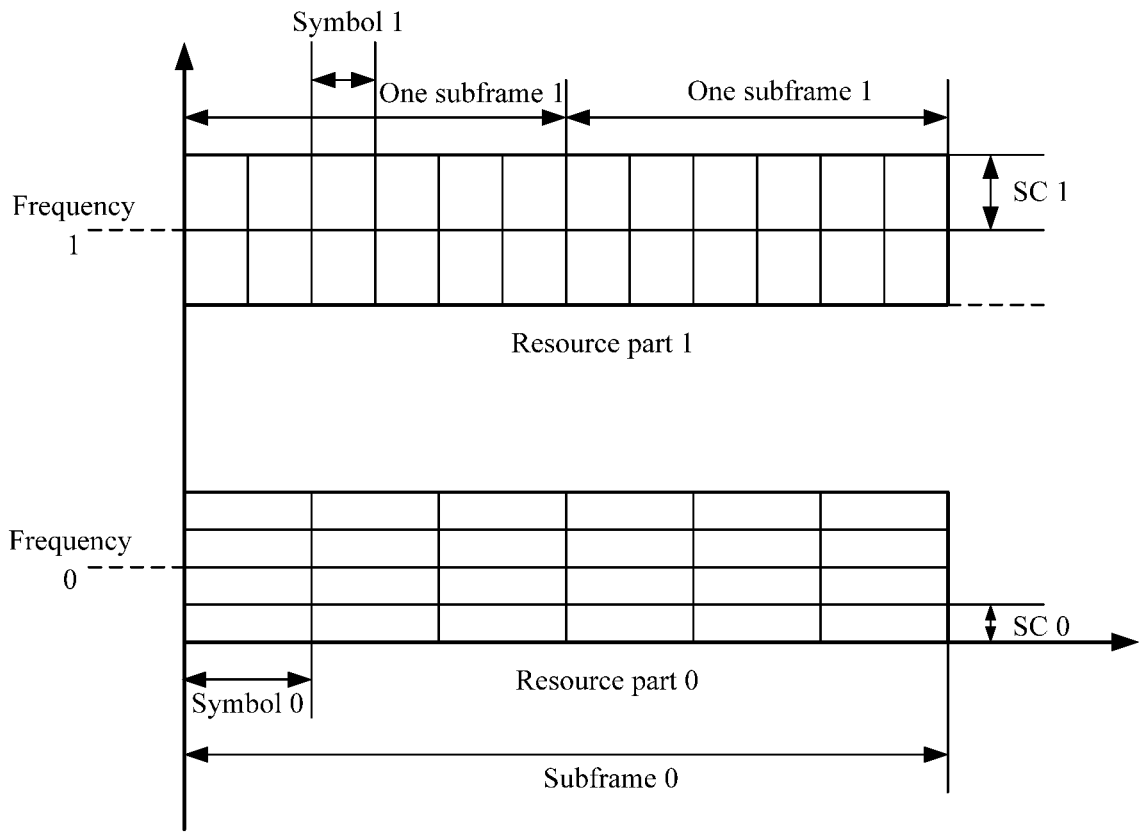
FIG. 3 is a schematic diagram of a resource structure in which data is transmitted by using different subcarrier spacings at different frequencies according to an embodiment of the present invention.

Embodiments of the present invention provide the system based on multi-parameter data transmission. The multi-parameter system may support sending data by using a plurality of types of subcarrier spacings, for example, 7.5 KHz, 15 KHz, 30 KHz, 60 KHz, and 120 KHz, or may send signals by using one (for example, all using 15 KHz or 30 KHz) or more types of subcarrier spacings (for example, using 15 KHz and 300 KHz at a 2 GHz carrier frequency, or using 60 KHz at a 30 GHz carrier frequency) at a same frequency and different frequencies, as shown in FIG. 1, FIG. 2, and FIG. 3. FIG. 1 is a schematic diagram of a resource structure in which data is sent by using a same subcarrier spacing according to an embodiment of the present invention. FIG. 2 is a schematic diagram of a resource structure in which data is sent by using a plurality of types of subcarrier spacings at a same frequency according to an embodiment of the present invention. FIG. 3 is a schematic diagram of a resource structure in which data is sent by using different subcarrier spacings at different frequencies according to an embodiment of the present invention. The data herein is data sent over a physical channel or a physical signal, data sent on the physical channel includes information from a higher layer (such as an RRC (Radio Resource Control) layer or a MAC (Media Access Control) layer), and data sent over the physical signal includes a sequence generated on a physical layer.

Based on the data transmission method provided by this embodiment of the present invention, diversity and flexibility of service data transmission are improved, and service types supported by the multi-parameter system can be extended.

Optionally, in the system in which the plurality of parameters are supported, before transmitting, by the multi-parameter system, data over the physical channel or the physical signal by using at least one subcarrier spacing, the method further includes: configuring the physical channel or the physical signal in the multi-parameter system, determining the data used by the physical channel or the physical signal in the multi-parameter system, and determining a resource to which the data of the physical channel or the physical signal in the multi-parameter system is mapped.

It should be noted that in this embodiment of the present invention, configuring may be understood as defining or setting, determining may be understood as assuming or generating, and using or transmitting may be understood as sending or receiving.

In this embodiment of the present invention, the configuring the physical channel in the multi-parameter system may include defining a resource structure (including numbers of RBs) of the physical channel and determining a precoding granularity of the physical channel, where the resource structure includes numbers of resource blocks RBs, and numbers of subcarriers; and the precoding granularity of the physical channel is a unit used by the physical channel for precoding, that is, a quantity of RBs that can be used as a group by the physical channel for precoding to transmit data once.

Optionally, in this embodiment of the present invention, the defining the physical signal in the multi-parameter system may include configuring a synchronization signal. In other words, corresponding synchronization signals are configured for different subcarrier spacings supported by the multi-parameter system.

In this embodiment of the present invention, the determining the data used by the physical channel or the physical signal in the multi-parameter system may include determining a sequence used by the synchronization signal. In other words, the sequence used over the synchronization signal supported by the multi-parameter system is generated.

Optionally, in this embodiment of the present invention, the determining the data used by the physical channel or the physical signal in the multi-parameter system may include determining a sequence used by a reference signal. In other words, the sequence used over the reference signal supported by the multi-parameter system is generated.

Optionally, in this embodiment of the present invention, the configuring the physical signal in the multi-parameter system may include configuring a subcarrier spacing or a relative subcarrier spacing that is used when the reference signal is sent.

Optionally, in this embodiment of the present invention, the determining a resource to which the data of the physical signal in the multi-parameter system is mapped includes determining a quantity of sending times of the reference signal or a quantity of symbols to which the reference signal is mapped in a period of time. Optionally, in this embodiment of the present invention, the setting the physical channel in the multi-parameter system may include setting a subcarrier spacing that is used when sending is performed by using a physical layer random access channel.

It should be noted that in this embodiment of the present invention, not only the synchronization signal can be configured, but also another channel, for example, a data channel or a control channel in the physical channel, or a reference signal in the physical signal, in the multi-parameter system can be configured. This is not limited in this embodiment of the present invention.

In this embodiment of the present invention, the configuring a synchronization signal may include configuring at least one synchronization signal and at least one subcarrier spacing used to send a first sequence over each synchronization signal.

To be specific, one or more synchronization signals are configured for the multi-parameter system, and sending of a sequence by using one or more subcarrier spacings can be supported over each synchronization signal, so that synchronization between the sending device (such as a base station) and the receiving device (such as a terminal) in the multi-parameter system is implemented.

Optionally, in an embodiment of the present invention, a quantity of subcarrier spacings used when a synchronization sequence is sent over one synchronization signal is configured to be less than or equal to a quantity of subcarrier spacings supported by the multi-parameter system.

In this embodiment of the present invention, a quantity of synchronization signals and a quantity of subcarrier spacings used when the first sequence is sent or received over the synchronization signal are both configured to be less than or equal to a quantity of a plurality of types of subcarrier spacings supported by the multi-parameter system. To be specific, the quantity of subcarrier spacings used when the first sequence is sent over the synchronization signal by the sending device in the multi-parameter system is configured to be less than or equal to the quantity of subcarrier spacings supported by the multi-parameter system, and the quantity of subcarrier spacings used when the first sequence is received over the synchronization signal by the receiving device in the multi-parameter system is configured to be less than or equal to the quantity of subcarrier spacings supported by the multi-parameter system.

Figure 4:
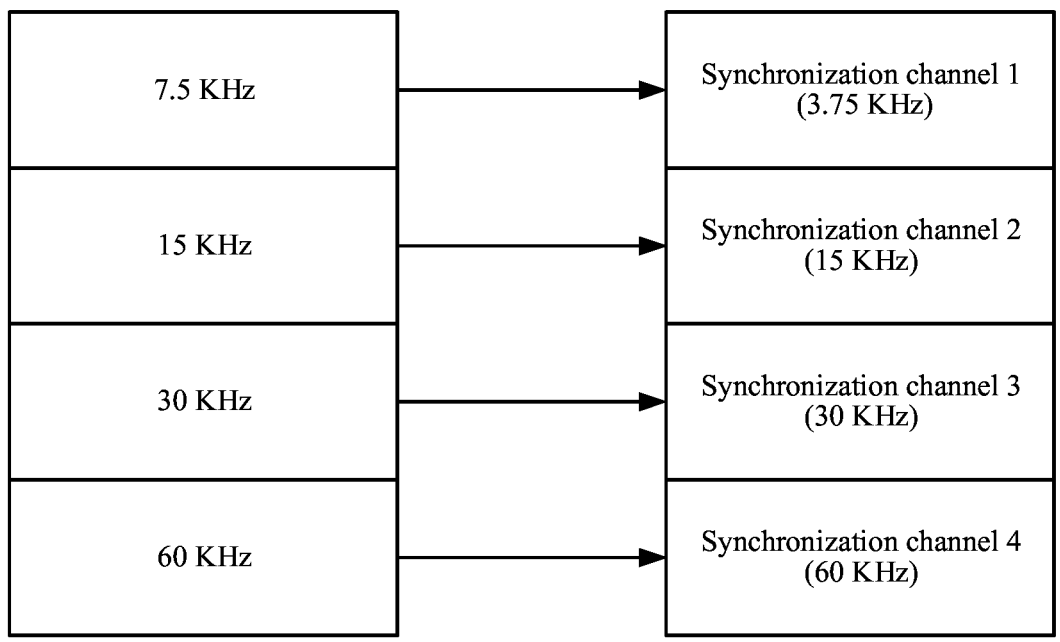
FIG. 4 is a schematic diagram of a correspondence among a subcarrier spacing supported by a system, a synchronization signal, and a subcarrier spacing that is used when data is transmitted over the synchronization signal according to an embodiment of the present invention.

In this embodiment of the present invention, the quantity of synchronization signals may be configured to be equal to the quantity of subcarrier spacings supported by the multi-parameter system. As shown in FIG. 4, a quantity of a plurality of types of subcarrier spacings that may be supported by the multi-parameter system is four, which are respectively: 7.5 KHz, 15 KHz, 30 KHz, and 600 KHz, and a quantity of synchronization signals is configured as four, which are respectively: a synchronization signal 1, sending a synchronization sequence by using a 3.75 KHz subcarrier spacing; a synchronization signal 2, sending a synchronization sequence by using a 15 KHz subcarrier spacing; a synchronization channel 3, sending a synchronization sequence by using a 600 KHz subcarrier spacing; and a synchronization channel 4, sending a synchronization sequence by using a 120 KHz subcarrier spacing. In this embodiment, a sequence is sent over one synchronization signal by using one subcarrier spacing.

Figure 5A:
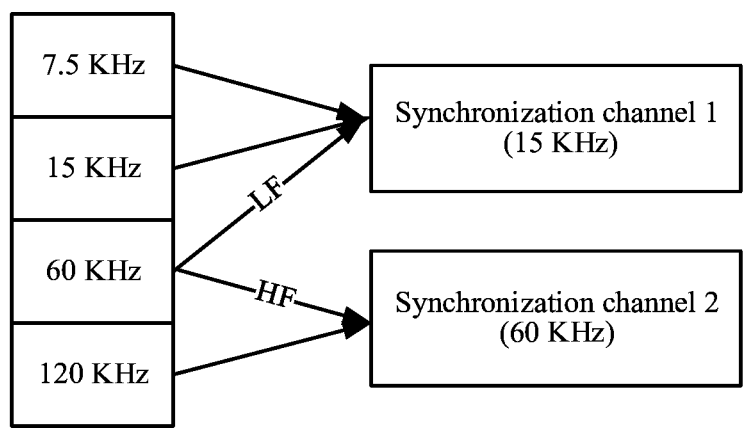
FIG. 5(a) is a schematic diagram of a correspondence among a subcarrier spacing supported by another system, a synchronization signal, and a subcarrier spacing that is used when data is transmitted over the synchronization signal according to an embodiment of the present invention.
Figure 5B:
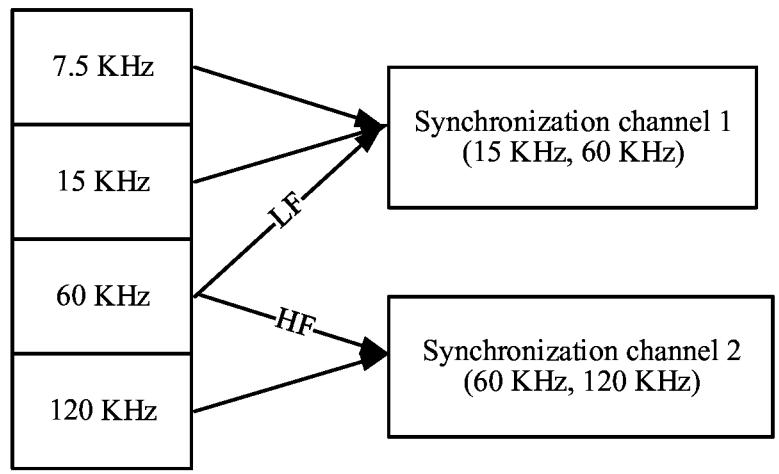
FIG. 5(b) is a schematic diagram of a correspondence among a subcarrier spacing supported by still another system, a synchronization signal, and a subcarrier spacing that is used when data is transmitted over the synchronization signal according to an embodiment of the present invention.

In this embodiment of the present invention, the quantity of synchronization signals may be further configured to be less than the quantity of the plurality of types of subcarrier spacings supported by the multi-parameter system, where each synchronization signal uses at least one type of subcarrier spacing to send or receive the sequence. For example, as shown in FIG. 5, a quantity of a plurality of types of subcarrier spacings that may be supported by the multi-parameter system is four, which are respectively: 7.5 KHz, 15 KHz, 60 KHz, and 120 KHz, and two synchronization signals may be configured, which are respectively: a synchronization signal 1 and a synchronization signal 2. One subcarrier spacing may be used to send the sequence over the synchronization signal 1 or the synchronization signal 2. As shown in FIG. 5 (a), a 15 KHz subcarrier spacing may be used to send a sequence over the synchronization signal 1, and a 600 KHz subcarrier spacing may be used to send a sequence over the synchronization signal 2. Alternatively, a plurality of types of subcarrier spacings may be used to send the sequence. As shown in FIG. 5 (b), the 15 KHz or 600 KHz subcarrier spacing may be used to send the sequence over the synchronization signal 1, and the 600 KHz or 120 KHz subcarrier spacing may be used to send the sequence over the synchronization signal 2.

It should be noted that herein the synchronization signal is used as an example, to describe configured channel quantities of various channels (for example, a pilot channel, a data channel, and a control channel) in the physical channel, and quantities of subcarrier spacings used when corresponding signals are sent by using the channels in the physical channel. In this embodiment of the present invention, the quantities of various channels in the physical channel in the multi-parameter system and the quantities of subcarrier spacings used when corresponding signals are sent by using the corresponding channels may also be configured in this manner, or may be configured by using another quantity configuration relationship. This is not limited in this embodiment of the present invention.

Optionally, in this embodiment of the present invention, the at least one synchronization signal and the subcarrier spacing that is used when the first sequence is sent over each synchronization signal are configured based on a carrier frequency or a service type.

For example, in this embodiment of the present invention, the synchronization signal and the subcarrier spacing that is used when the sequence is sent over the synchronization signal may be set based on the carrier frequency. For example, it is configured that for a carrier frequency below 6 GHz, one synchronization signal is used to send the sequence, and for the synchronization signal, the sequence is sent by using the 15 KHz subcarrier spacing. For a carrier frequency above 6 GHz, the sequence is sent by using another synchronization signal, and for the primary synchronization signal, the sequence is sent by using the 60 KHz subcarrier spacing.

In this embodiment of the present invention, the synchronization signal and the subcarrier spacing that is used when the sequence is sent over the synchronization signal may be alternatively configured based on the service type. For example, it is configured that the multi-parameter system uses one synchronization signal and performs transmission by using the 15 KHz subcarrier spacing when supporting data transmission of an eMBB service. It is configured that the multi-parameter system uses one synchronization signal and performs transmission by using the 3.75 KHz subcarrier spacing when supporting data transmission of an mMTC service. It is configured that the multi-parameter system uses one synchronization signal and performs transmission by using the 60 KHz subcarrier spacing when supporting data transmission of a URLLC service. When supporting data transmission of the eMBB service and the mMTC service, it is configured that the multi-parameter system supports one synchronization signal, where the synchronization signal is transmitted by using the 3.75 KHz subcarrier spacing and the 15 KHz subcarrier spacing; or supports two synchronization signals, where one synchronization signal is transmitted by using the 3.75 KHz subcarrier spacing, and the other synchronization signal is transmitted by using the 15 KHz subcarrier spacing.

It should be noted that in this embodiment of the present invention, a rule according to which the receiving device in the multi-parameter system receives the first sequence may be configured. For example, data is received by using a receiving capability of the receiving device or a mode of a receiving device, a carrier frequency used when the data is transmitted, or a rule according to which the receiving device receives data and that is configured by using signaling. Herein, the synchronization signal is used as an example, the sending device sends the first sequence over the synchronization signal by using a plurality of subcarrier spacings, and the receiving device receives the first sequence.

For example, in this embodiment of the present invention, the receiving device may receive the first sequence based on a receiving end mode/a receiving end capability. For example, a receiving device type or a receiving device capability supporting the eMBB service is defined as a receiving mode 1 or a receiving capability 1, and a synchronization signal corresponding to the eMBB service is defined to send data by using the 15 KHz subcarrier spacing, and accordingly, the receiving device receives the first sequence by using the 15 KHz subcarrier spacing. For another example, a receiving device type or a receiving device capability supporting the mMTC service is defined as a receiving mode 2 or a receiving capability 2, and a synchronization signal corresponding to the mMTC service is defined to send the first sequence by using the 3.75 KHz subcarrier spacing over a synchronization signal, and accordingly, the receiving device receives the first sequence by using the 3.75 KHz subcarrier spacing. For still another example, a receiving device type or a receiving device capability supporting the URLLC service is defined as a receiving mode 3 or a receiving capability 3, and a synchronization signal corresponding to the URLLC service is defined to send the first sequence by using the 60 KHz subcarrier spacing. In this way, the receiving device receives the first sequence by using the 60 KHz subcarrier spacing.

In this embodiment of the present invention, the receiving device may receive the first sequence based on the carrier frequency. For example, a synchronization signal is defined to send the first sequence at a carrier frequency below 6 GHz by using the 15 KHz subcarrier spacing, and accordingly, the receiving device receives the first sequence by using the 15 KHz subcarrier spacing when working at the carrier frequency below 6 GHz. For example, a synchronization signal is defined to send the first sequence at a carrier frequency above 6 GHz by using the 60 KHz subcarrier spacing, and accordingly, the receiving device receives the first sequence by using the 300 KHz subcarrier spacing when working at the carrier frequency above 6 GHz.

In this embodiment of the present invention, the receiving device may receive a quantity of synchronization signals of a same type and receive subcarrier spacings used by the synchronization signals based on signaling configuration. For example, signaling sent by a base station is received, and the signaling notifies the receiving device (such as a terminal) to receive the first sequence by using the 15 KHz subcarrier spacing. In this way, after receiving the signaling, the terminal receives the first sequence by using the 15 KHz subcarrier spacing. The signaling may be broadcast signaling, Media Access Control (MAC) layer control signaling alternatively referred to as Medium Access Control layer control signaling, or physical layer control signaling.

Optionally, in another embodiment of the present invention, the first sequence used by the synchronization signal is determined.

In this embodiment of the present invention, the first sequence may be determined based on one or more types of information: an identifier of the synchronization signal, the subcarrier spacing or a carrier frequency.

The first sequence of the synchronization signal may be determined based on the ID of the synchronization signal. For example, the sending device in the multi-parameter system sends the sequence over two synchronization signals in a cell, and the two synchronization signals may be referred to as a synchronization signal 1 and a synchronization signal 2. A sequence sent over the synchronization signal 1 is configured as a sequence value 1, a sequence sent over the synchronization signal 2 is configured as a sequence value 2, and the sequence value 1 and the sequence value 2 may be the same or different. This is not specifically required in the present invention.

In this embodiment of the present invention, the first sequence may be alternatively determined based on a subcarrier spacing. For example, one synchronization signal is used to send a sequence by using two subcarrier spacings, and the two subcarrier spacings may be referred to as a subcarrier spacing 1 and a subcarrier spacing 2. A sequence value of the first sequence sent over the synchronization signal by using the subcarrier spacing 1 is configured as a sequence value 1, and a sequence value of the first sequence sent over the synchronization signal by using the subcarrier spacing 2 is configured as a sequence value 2, where the sequence value 1 and the sequence value 2 may be the same or different. This is not specifically required in the present invention.

In this embodiment of the present invention, the synchronization sequence may be further determined based on the carrier frequency. For example, the synchronization signal may be sent at a plurality of carrier frequencies, and the two carrier frequencies may be referred to as a carrier frequency one and a carrier frequency two. A sequence value of the first sequence sent over the synchronization signal at the carrier frequency one is configured as a sequence value 1, and a sequence value of the first sequence sent over the synchronization signal at the carrier frequency two is configured as a sequence value 2, where the sequence value 1 and the sequence value 2 may be the same or different. This is not specifically required in the present invention.

It should be noted that in this embodiment of the present invention, a rule according to which the first sequence is determined based on information of any two or all of the identifier of the synchronization signal, the subcarrier spacing, or the carrier frequency may be further configured. In this embodiment of the present invention, configuration of the rule is not limited.

Optionally, in this embodiment of the present invention, a frequency domain location and a time domain location of a resource to which the first sequence is mapped are determined.

A resource to which the first sequence used when at least one synchronization signal is sent by using at least one subcarrier spacing is mapped is determined. Specifically, a time frequency resource to which the first sequence is mapped is determined. The time frequency resource includes the time domain location and the frequency domain location of the resource. The time domain location may be a location, such as a symbol location, a subframe location, or a radio frame location, of a time unit. The frequency domain location may be a location, such as a resource block group location, a resource block (RB) location, or a subcarrier location, of a frequency domain unit. Specifically, in this embodiment of the present invention, the synchronization signal may include a primary synchronization signal, or a primary synchronization signal and a secondary synchronization signal. When only a primary synchronization signal exists, the primary synchronization signal may be referred to as a synchronization signal. This also falls within the protection scope of the present invention.

Figure 6A:
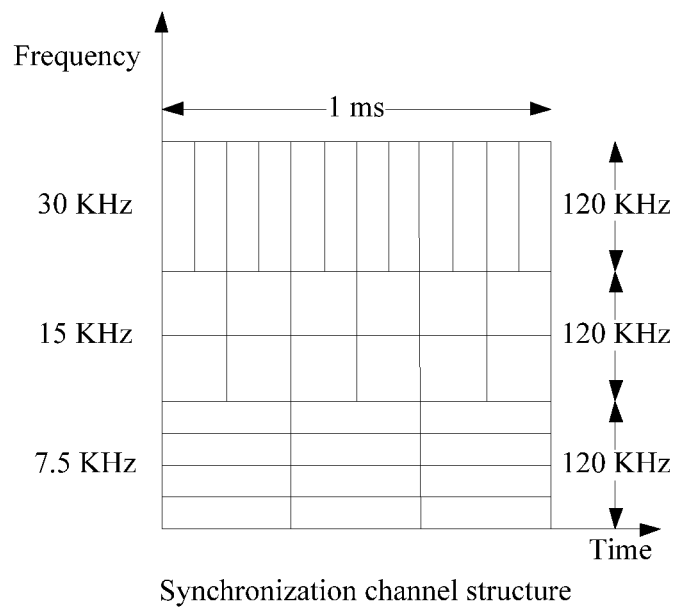
FIG. 6(a) is a schematic structural diagram of a frequency division multiplexed synchronization signal in a carrier frequency domain according to an embodiment of the present invention.
Figure 6B:
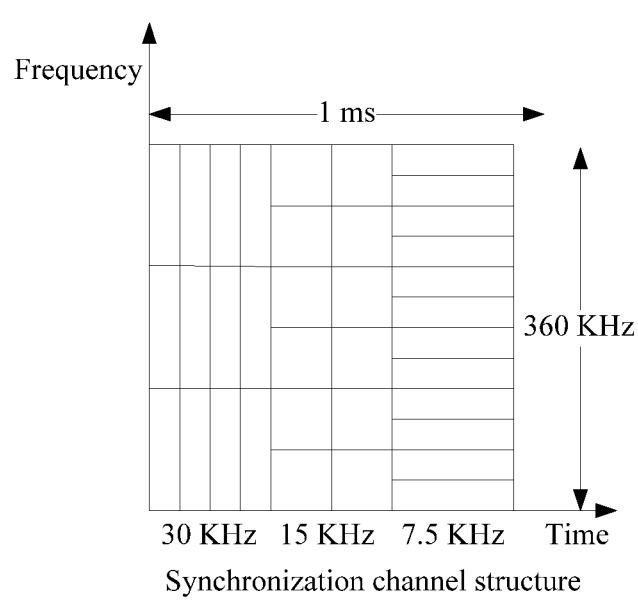
FIG. 6(b) is a schematic structural diagram of a time division multiplexed synchronization signal in a carrier frequency domain according to an embodiment of the present invention.

In this embodiment of the present invention, a frequency domain resource to which the first sequence is mapped may be determined based on one or more types of information: the identifier of the synchronization signal, the subcarrier spacing, or the carrier frequency. For example, when there are a plurality of synchronization signals in the multi-parameter system, for each synchronization signal, resource mapping of the first sequence corresponding to the synchronization signal is configured. For example, when the synchronization signals can be used to send the first sequence by using at least one subcarrier spacing in the multi-parameter system, for each subcarrier spacing of each synchronization signal, resource mapping of the first sequence corresponding to the subcarrier spacing is configured. For example, as shown in FIG. 6, resources of synchronization signals of different subcarrier spacings may be frequency division multiplexed (shown in FIG. 6 (*a*)), time division multiplexed (shown in FIG. 6 (*b*)), or time division multiplexed and frequency division multiplexed, in a carrier frequency domain.

In this embodiment of the present invention, resource mapping of the first sequence sent over the synchronization signal is configured based on a carrier frequency. For example, when a same synchronization signal may be used when sequences are sent at a plurality of frequencies in the multi-parameter system, for a synchronization channel below 6 GHz, a resource mapping location one of the first sequence is configured, and for a synchronization channel above 6 GHz, a resource mapping location two of the first sequence is configured.

Figure 7:
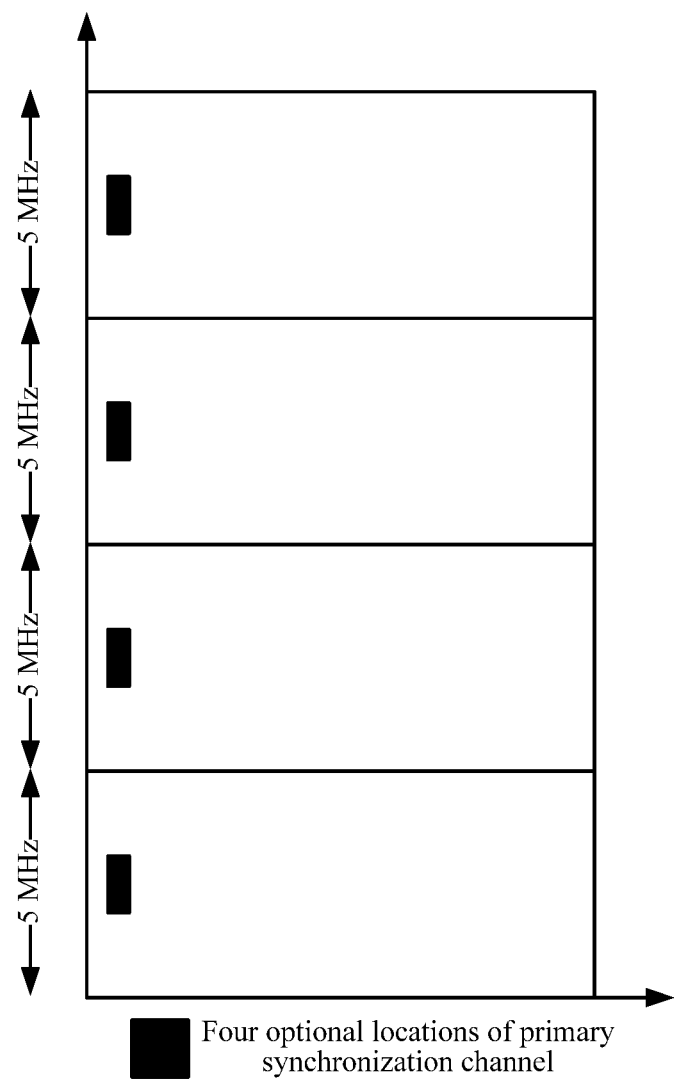
FIG. 7 is a schematic diagram of a resource location to which a synchronization signal is mapped according to an embodiment of the present invention.

In this embodiment of the present invention, when it is configured that the first sequence is sent over one synchronization signal or over one synchronization signal by using one type of subcarrier spacing, at least one of a plurality of optional locations to which a resource of the first sequence is mapped is determined, and the sending device in the multi-parameter system selects one location for sending. As shown in FIG. 7, each resource block is a location to which the resource of the first sequence is mapped. When the multi-parameter system sends the first sequence, one location is selected from four locations shown in FIG. 7, the first sequence is mapped to the selected location, and the first sequence is sent to the receiving device in the multi-parameter system.

In this embodiment of the present invention, when one synchronization signal is configured or one synchronization signal is configured to use one type of subcarrier spacing to send the first sequence, a sending end may determine, based on a location of a resource to which a sequence of the synchronization signal is mapped, relative locations of a primary synchronization signal and a secondary synchronization signal, and a receiving end may determine, based on the received relative locations of the primary synchronization signal and the secondary synchronization signal, the location of the resource to which the sequence of the synchronization signal is mapped. As shown in FIG. 8, the sending end may configure the primary synchronization signal PSS of the synchronization signals to be mapped to a location, and configure the secondary synchronization signal to be mapped to a remaining plurality of locations. When the first sequence needs to be sent in the multi-parameter system, one mapping location is selected from the plurality of mapping locations to which the secondary synchronization signal is mapped for mapping, and the mapped primary synchronization signal and secondary synchronization signal are sent to the receiving device in the multi-parameter system. When the synchronization signal is sent at different time locations or frequency domain locations, selected locations of the secondary synchronization signal are different. For example, for the sending device, when the synchronization signal is sent in a subframe 0, a sequence used by the secondary synchronization signal is mapped to a location 0, when the synchronization signal is sent in a subframe 1, the sequence used by the secondary synchronization signal is mapped to a location 1, when the synchronization signal is sent in a subframe 2, the sequence used by the secondary synchronization signal is mapped to a location 2, when the synchronization signal is sent in a subframe 3, the sequence used by the secondary synchronization signal is mapped to a location 3, and when the synchronization signal is sent in a subframe 4, the sequence used by the secondary synchronization signal is mapped to a location 4. After the receiving device receives the primary synchronization signal and the secondary synchronization signal, when the primary synchronization signal and the secondary synchronization signal are in a same time domain unit and neighboring frequency domain units, and a receiving frequency of the secondary synchronization signal is higher than that of the primary synchronization signal, the receiving end considers that the subframe 0 is a current subframe. When the received primary synchronization signal and the received secondary synchronization signal are in a same time domain unit and neighboring frequency domain units, and a receiving frequency of the secondary synchronization signal is lower than that of the primary synchronization signal, the receiving end considers that the subframe 1 is a current subframe. When the received primary synchronization signal and the received secondary synchronization signal are in neighboring time domain units and neighboring frequency domain units, and a receiving frequency of the secondary synchronization signal is higher than that of the primary synchronization signal, the receiving end considers that the subframe 2 is a current subframe. When the received primary synchronization signal and the received secondary synchronization signal are in neighboring time domain units and neighboring frequency domain units, and a receiving frequency of the secondary synchronization signal is equal to that of the primary synchronization signal, the receiving end considers that the subframe 3 is a current subframe. When the received primary synchronization signal and the received secondary synchronization signal are in neighboring time domain units and neighboring frequency domain units, and a receiving frequency of the secondary synchronization signal is lower than that of the primary synchronization signal, the receiving end considers that the subframe 4 is a current subframe.

In this embodiment of the present invention, an RB location and a subcarrier location of the frequency domain resource to which the first sequence is mapped are configured. The RB location may be a location indicated after RB numbering is performed on a transmission bandwidth by using a baseline subcarrier spacing (such as a 15 KHz subcarrier spacing), or may be a location indicated after RB numbering is performed on a transmission bandwidth by using a subcarrier spacing corresponding to the synchronization signal.

The subcarrier location may be a location indicated after subcarrier numbering is performed on a transmission bandwidth by using a baseline subcarrier spacing, or may be a location indicated after subcarrier numbering is performed on a transmission bandwidth by using a subcarrier spacing corresponding to the synchronization signal.

For example, in the prior art, in LTE, a synchronization signal is configured to be located at 62 subcarriers of 6 RBs of a center bandwidth obtained after RB numbering is performed on the transmission bandwidth by using a 15 KHz baseline subcarrier spacing.

The foregoing is a process of configuring the synchronization channel in the physical channel and corresponding relationships. A sending manner and a receiving manner of devices in the multi-parameter system configured in the embodiments of the present invention are described by using downlink synchronization as an example below.

In the embodiments of the present invention, the multi-parameter system may include the sending device and the receiving device. In the embodiments of the present invention, the sending device may be a base station, and the receiving device may be a terminal. However, in the embodiments of the present invention, the sending device and the receiving device are not limited.

For example, the sending device may be a base station (for example, an access point), and may refer to a device that communicates with a wireless terminal through one or more sectors on an air interface in an access network. A base station device may further coordinate attribute management of the air interface. For example, the base station device may be an evolved Node B (NB or e-NodeB) or an access point in LTE. This is not limited in the present invention. It should be noted that in the embodiments of the present invention, the base station not only may be the base station device, but also may be a relay device, or another network element device having a base station function.

The receiving device may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile console (Mobile), a remote station (RS), an access point (AP), a remote terminal (RT), an access terminal (AT), a user terminal (UT), a user agent (UA), a user device (UD), or user equipment (UE).

Figure 9:
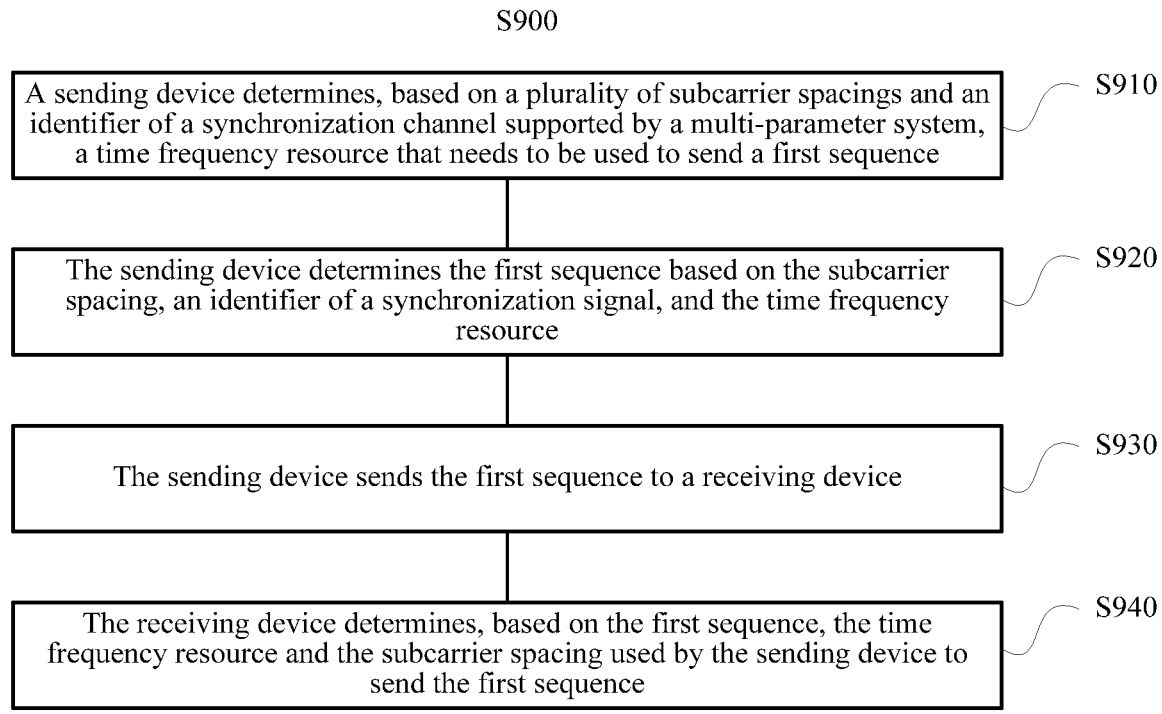
FIG. 9 is a flowchart of a downlink synchronization method according to an embodiment of the present invention.

FIG. 9 is a flowchart of a downlink synchronization method according to an embodiment of the present invention. As shown in FIG. 9, a method 900 is executed by a sending device and a receiving device included in a multi-parameter system.

S910. A sending device determines, based on a plurality of subcarrier spacings and an identifier of a synchronization channel, a time frequency resource to which a first sequence is mapped, where the time frequency resource includes a time domain location and a frequency domain location of the first sequence.

The sending device determines, based on the identifier of the synchronization channel and a subcarrier spacing that can be used, at least one time frequency resource that may be mapped to, and selects at least one available time frequency resource of the synchronization signal from the at least one time frequency resource.

The sending device determines, based on the identifier of the synchronization channel and the subcarrier spacing, the time frequency resource to which the synchronization signal is mapped, and selects, based on configured relative locations of a primary synchronization signal and a secondary synchronization signal and a resource mapping relationship, time frequency locations and frequency domain locations of the primary synchronization signal and the secondary synchronization signal.

S920. The sending device determines the first sequence based on the subcarrier spacing, the identifier of the synchronization signal, and the time frequency resource.

The sending device determines, based on the selected time domain location and frequency domain location, the subcarrier spacing, the identifier of the synchronization signal, and the time frequency resource, the first sequence to be sent over the synchronization signal, and maps the first sequence to the time frequency resource determined in S910, so that the sending device sends the first sequence to the receiving device over the selected synchronization signal by using the selected subcarrier spacing.

It should be noted that in this embodiment of the present invention, the time frequency resource to which the first sequence is mapped may be further determined based on one or more types of information: the subcarrier spacing or the identifier of the synchronization signal. This is not limited in this embodiment of the present invention.

It should be noted that in this embodiment of the present invention, the first sequence may be further determined based on one or more types of information: the subcarrier spacing or the identifier of the synchronization signal. This is not limited in this embodiment of the present invention.

It should be additionally noted that in this embodiment of the present invention, the first sequence may be determined based on an identifier of a cell. In this embodiment of the present invention, the first sequence may be further determined based on other information. This is not limited in this embodiment of the present invention.

S930. The sending device sends the first sequence to a receiving device.

The sending device maps a synchronization sequence to a time frequency resource over a determined synchronization signal by using a selected subcarrier spacing, and sends the first sequence to the receiving device, so that the receiving device performs downlink synchronization based on the synchronization signal.

S940. The receiving device determines, based on the first sequence, the time frequency resource and the subcarrier spacing used by the sending device to send the first sequence.

The receiving device performs blind detection on the first sequence sent by the sending device, to obtain the first sequence. When obtaining the first sequence, the receiving device determines, based on a sequence value of the first sequence, the time frequency resource and the subcarrier spacing used by the sending device to send the first sequence, to complete downlink synchronization.

It should be noted that if sequence values of identifiers of different cells are different, the receiving device may determine the identifiers of the cells based on the first sequence. If relative locations of the primary synchronization signal and the secondary synchronization signal are different when the synchronization signal is sent by using different time units or frequency domain resources, the receiving device may determine, based on the relative locations of the received primary synchronization signal and the received secondary synchronization signal, a number of a time unit or a frequency domain resource for currently receiving a synchronization signal. Corresponding information is determined based on a configuration of the first sequence. In this embodiment of the present invention, the configuration of the first sequence is not limited.

Optionally, in this embodiment of the present invention, the configuring the physical signal in the multi-parameter system may include configuring a relative subcarrier spacing that is used when the reference signal is sent.

The reference signal includes a sounding reference signal (Sounding reference signal, SRS), a channel state information reference signal (CSI-RS), a beamforming reference signal (BRS), a beamforming refinement reference signal (BRRS), a demodulation reference signal (DM-RS), and a discovery reference signal (DRS), or may include a reference signal used for measurement. This is not specifically limited in the present invention.

In this embodiment of the present invention, the subcarrier spacing or the relative subcarrier spacing used by the reference signal is predefined or configured by using signaling. For example, the base station sends signaling to user equipment, and the signaling may include control information carried by a physical layer control signal and/or higher layer signaling carried by a physical layer data channel, to indicate the subcarrier spacing or the relative subcarrier spacing used by the reference signal. The relative subcarrier spacing may indicate a relationship between the subcarrier spacing used to send the reference signal and other at least one subcarrier spacing that is used by the physical channel or the physical signal.

In this embodiment of the present invention, the baseline subcarrier spacing used by the reference signal or the relative subcarrier spacing used to send the reference signal is predefined or configured by using signaling. For example, the baseline subcarrier spacing is predefined or configured by the base station by using signaling. For example, a 60 KHz baseline subcarrier spacing used by the reference signal is configured. For example, that the relative subcarrier spacing of the reference signal is configured by using signaling may include that a correspondence between a signaling information bit and the subcarrier spacing of the reference signal or the relative subcarrier spacing of the reference signal is predefined or configured by using signaling. The base station device determines the signaling bit based on the correspondence between the signaling information bit and the subcarrier spacing of the reference signal or the relative subcarrier spacing of the reference signal, and the configured subcarrier spacing or relative subcarrier spacing used by the reference signal, and sends the signaling information bit to the user equipment by using signaling. After receiving the signaling, the user equipment determines, based on the correspondence between the signaling information bit and the subcarrier spacing or the relative subcarrier spacing of the reference signal, the subcarrier spacing used by the reference signal. For example, the correspondence between the signaling information bit and the subcarrier spacing or the relative subcarrier spacing of the reference signal is configured as shown in Table 1. Table 1 is a comparison table of the signaling information and the subcarrier spacing of the reference signal that is indicated by the signaling information.

TABLE 1

| Signaling information bit | Subcarrier spacing of reference signal | Relative subcarrier spacing of reference signal |
| --- | --- | --- |
| 00 | 60 KHz | X1 |
| 01 | 120 KHz | X2 |
| 10 | 240 KHz | X4 |
| 11 | 480 KHz | X8 |

Figure 10:
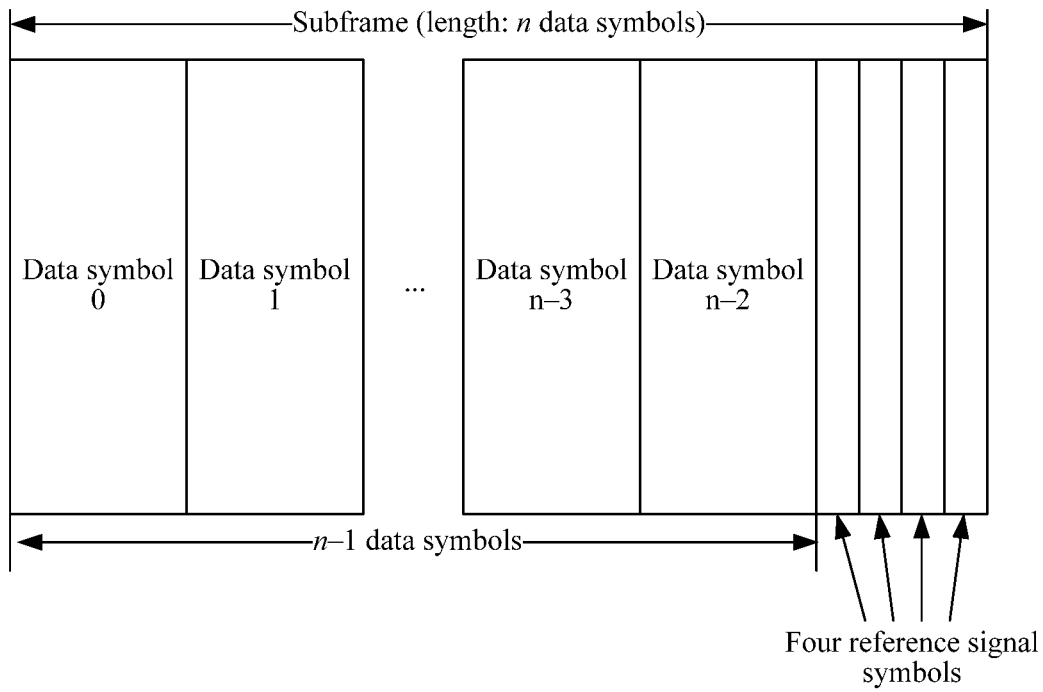
FIG. 10 is a schematic structural diagram of a time unit according to an embodiment of the present invention.

For example, in Table 1, the relative subcarrier spacing of the reference signal is configured as a subcarrier spacing of the reference signal relative to a subcarrier spacing of a data channel. The 60 KHz subcarrier spacing is used when the data channel is transmitted. When a 240 KHz subcarrier spacing is configured to send the reference signal on a base station side, that is, when the subcarrier spacing used by the reference signal is four times the subcarrier spacing used by the data channel, signaling information bit is set to 10, and the signaling information is sent to the user equipment. When receiving the signaling information bit of 10, the user equipment determines that the subcarrier spacing used by the reference signal is 240 KHz, or determines that the subcarrier spacing used by the reference signal is four times the subcarrier spacing used by the data channel. That is, the subcarrier spacing used by the reference signal is 240 KHz. When the data channel uses the 60 KHz subcarrier spacing, and the subcarrier spacing used by the reference signal is four times the subcarrier spacing used by the data channel, the reference signal is sent by using four time units. The four time units may be consecutive or nonconsecutive in time domain. This is not limited in the present invention. The time unit may refer to symbols, as shown in FIG. 10, where n represents a quantity of data symbols.

Optionally, in another embodiment of the present invention, the determining a resource to which the data of the physical signal in the multi-parameter system is mapped includes determining a quantity of sending times of the reference signal or a quantity of symbols to which the reference signal is mapped in a period of time. For example, in this embodiment of the present invention, the quantity of sending times of the reference signal or the quantity of symbols to which the reference signal is mapped in a particular period of time is predefined or configured by using signaling. For example, the quantity of sending times of the reference signal or the quantity of symbols to which the reference signal is mapped in the particular period of time is predefined or configured by using signaling as four. The base station device determines the signaling bit based on a correspondence between the signaling information bit and the quantity of sending times of the reference signal or the quantity of symbols to which the reference signal is mapped in the particular period of time, and sends the signaling information bit to the user equipment by using signaling. After receiving the signaling, the user equipment determines, based on the correspondence between the signaling information bit and the quantity of sending times of the reference signal or the quantity of symbols to which the reference signal is mapped in the particular period of time, the quantity of sending times of the reference signal or the quantity of symbols to which the reference signal is mapped in the particular time. For example, the correspondence between the signaling information bit and the quantity of sending times of the reference signal or the quantity of symbols to which the reference signal is mapped in the particular period of time is configured as shown in Table 2. Table 2 is a comparison table of the signaling information and the subcarrier spacing of the reference signal that is indicated by the signaling information.

TABLE 2

| Signaling information bit | Quantity of sending times of reference signal or a quantity of symbols |
|---|---|
| 00 | 1 |
| 01 | 2 |
| 10 | 4 |
| 11 | 8 |

For example, the 60 KHz subcarrier spacing is used when the data channel is transmitted. When that the reference signal is sent for four times or four reference signal symbols are sent in a symbol length whose subcarrier spacing is 60 KHz is configured on the base station side, the signaling information bit is set to 10, and the signaling information is sent to the user equipment. When receiving the signaling information bit of 10, the user equipment determines that the reference signal is sent for four times or four reference signal symbols are sent in the symbol length whose subcarrier spacing is 60 KHz, and therefore the subcarrier spacing used by the reference signal is of 240 KHz.

Optionally, in another embodiment of the present invention, the configuring the physical signal in the multi-parameter system includes configuring a resource mapping method of the reference signal. For example, in this embodiment of the present invention, the resource mapping method of the reference signal is predefined or configured by using signaling. For example, the resource mapping method of the reference signal is predefined or configured by using signaling as mapping one RE every two subcarriers. The base station device determines the signaling bit based on a correspondence between the signaling information bit and the resource mapping method of the reference signal, and sends the signaling information bit to the user equipment by using signaling. After receiving the signaling, the user equipment determines the resource mapping method of the reference signal based on the correspondence between the signaling information bit and the resource mapping method of the reference signal. For example, the correspondence between the signaling information bit and the resource mapping method of the reference signal is configured as shown in Table 3. Table 3 is a comparison table of the signaling information and the mapping method of the reference signal that is indicated by the signaling information.

TABLE 3

| Signaling information bit | Mapping method of reference signal |
|---|---|
| 00 | Mapping one RE every eight subcarriers |
| 01 | Mapping one RE every four subcarriers |
| 10 | Mapping one RE every two subcarriers |
| 11 | Mapping one RE every subcarrier |

For example, when the reference signal is configured as mapping one RE every two subcarriers on the base station side, the signaling information bit is set to 10, and the signaling information is sent to the user equipment. When receiving the signaling information bit of 10, the user equipment determines that the reference signal maps to one RE every two subcarriers.

For example, in this embodiment of the present invention, a correspondence exists among the configured subcarrier spacing, relative subcarrier spacing, quantity of sending times, quantity of occupied symbols, and mapping method of the reference signal. Therefore, a user determines, based on one of the items that is indicated by using signaling, the other items. For example, the other items may be determined based on a correspondence shown in Table 4. Table 4 is a comparison table of the subcarrier spacing/relative subcarrier spacing/quantity of sending times/quantity of occupied symbols/mapping method.

TABLE 4

| Subcarrier spacing | Relative subcarrier spacing | Quantity of sending times | Quantity of occupied symbols | Mapping method |
|---|---|---|---|---|
| 60 KHz | X1 | 1 | 1 | Mapping one RE every eight subcarriers |
| 120 KHz | X2 | 2 | 2 | Mapping one RE every four subcarriers |
| 240 KHz | X4 | 4 | 4 | Mapping one RE every two subcarriers |
| 480 KHz | X8 | 8 | 8 | Mapping one RE every subcarrier |

Optionally, in another embodiment of the present invention, the determining the data used by the physical signal in the multi-parameter system further includes determining a sequence used by the reference signal.

In this embodiment of the present invention, the reference signal may be alternatively referred to as a pilot signal, and the reference signal may use at least one subcarrier spacing to transmit data.

Optionally, in this embodiment of the present invention, a second sequence may be determined based on the subcarrier spacing.

The second sequence may be alternatively referred to as a reference sequence. The second sequence is a sequence sent over the reference signal by using the at least one subcarrier spacing.

In this embodiment of the present invention, a same carrier frequency may support sending the second sequence by using a plurality of different subcarrier spacings. Different carrier frequencies may support sending the second sequence by using the same or different subcarrier spacings. For a system in which a plurality of subcarrier spacings are supported, different subcarrier spacings may be configured on a same resource. Therefore, when estimation is performed on data channels/signals from different subcarrier spacings, different reference signals need to be designed for each subcarrier spacing, to correctly estimate data of the different subcarrier spacings.

To better estimate channels of the different subcarrier spacings on the same resource or ensure that a correct current subcarrier spacing is used during switching between the subcarrier spacings, in this embodiment of the present invention, a sequence generation formula of the reference signal is designed as a pseudo-random sequence, where an initialization generation formula of the pseudo-random sequence includes an identifier $N_{ID}^{SC}$ of the subcarrier spacing.

$$c_{init} = 2^m \cdot (2^{10} \cdot (7 \cdot (n'_s + 1) + l + 1) \cdot (2 \cdot N_{ID}^{cell} + 1) + 2 \cdot N_{ID}^{cell} + N_{CP}) + N_{ID}^{SC},$$

where $$N_{ID}^{SC} = \begin{cases} 1 & \text{for } SC1 \\ 0 & \text{for } SC0 \end{cases};$$

and $n'_s$ represents a number of a subframe (subframe), $N_{ID}^{cell}$ represents an identifier of a cell, $N_{CP}$ represents a type of a cyclic prefix (CP), SC 1 represents one of the subcarrier spacings, and SC 0 represents other subcarrier spacings other than SC 1.

In this embodiment of the present invention, the method by using which the second sequence is determined based on the subcarrier spacing may be alternatively applied to a sequence used for physical channel scrambling.

Optionally, in this embodiment of the present invention, the setting the physical channel in the multi-parameter system may include setting a subcarrier spacing that is used when sending is performed by using a physical layer random access channel.

The random access channel is used for uplink access, and the base station can obtain access information of the user and a round-trip transmission delay by measuring the random access channel. Similar to configuring the reference signal, in a system based on a beamforming technology, a shorter preamble signal symbol reduces overheads of uplink access. Therefore, embodiments of the present invention provide a method for implementing faster beam switching by configuring a preamble signal by using a larger subcarrier spacing, reducing overheads of uplink access.

In this embodiment of the present invention, the setting the subcarrier spacing that is used when sending is performed by using the physical layer random access channel includes predefining or configuring by using signaling, a subcarrier spacing used by the preamble signal. The signaling includes broadcast information or higher layer signaling. This is not limited in the present invention. The signaling includes information bits indicating the subcarrier spacing used by the preamble signal.

In this embodiment of the present invention, the setting the subcarrier spacing that is used when sending is performed by using the physical layer random access channel includes predefining or configuring by using signaling, a baseline subcarrier spacing used by the preamble signal, and configuring by using signaling, a relative subcarrier spacing of the preamble signal. The relative subcarrier spacing may indicate a relationship between the subcarrier spacing that is used when sending is performed by using the random access channel and other at least one subcarrier spacing that is used by the physical channel or the physical signal. For example, the baseline subcarrier spacing is predefined or configured by the base station by using signaling. For example, the baseline subcarrier spacing used by the preamble signal is configured as 60 KHz. Alternatively, for example, the baseline subcarrier spacing used by the preamble signal is configured as a subcarrier spacing used by the data channel, such as the 60 KHz subcarrier spacing. The base station device determines the signaling bit based on a correspondence between the signaling information bit and the relative subcarrier spacing of the preamble signal, and the configured subcarrier spacing or relative subcarrier spacing used by the preamble signal, and sends the signaling information bit to the user equipment by using signaling. After receiving the signaling, the user equipment determines, based on the correspondence between the signaling information bit and the subcarrier spacing or relative subcarrier spacing of the preamble signal, the subcarrier spacing used by the preamble signal. For example, the correspondence between the signaling information bit and the subcarrier spacing or relative subcarrier spacing of the preamble signal is configured as shown in Table 5. Table 5 is a comparison table of the signaling information and the subcarrier spacing of the preamble signal that is indicated by the signaling information. As shown in Table 5, Table 5 is a comparison table of the signaling information and the subcarrier spacing of the preamble signal that is indicated by the signaling information.

TABLE 5

| Signaling information bit | Subcarrier spacing of preamble signal | Relative subcarrier spacing of preamble signal |
| --- | --- | --- |
| 00 | 60 KHz | X1 |
| 01 | 120 KHz | X2 |
| 10 | 240 KHz | X4 |
| 11 | 480 KHz | X8 |

For example, the 600 KHz subcarrier spacing is used when the data channel is transmitted. When the 240 KHz subcarrier spacing is configured to send the preamble signal on the base station side, to be specific, when the subcarrier spacing used by the preamble signal is four times the subcarrier spacing used by the data channel, the signaling information bit is set to 10, and the signaling information is sent to the user equipment. When receiving the signaling information bit of 10, the user equipment determines that the subcarrier spacing used by the preamble signal is 240 KHz, or determines that the subcarrier spacing used by the preamble signal is four times the subcarrier spacing used by the data channel. That is, the subcarrier spacing used by the preamble signal is 240 KHz.

Optionally, in this embodiment of the present invention, the setting the subcarrier spacing that is used when sending is performed by using the physical layer random access channel includes performing downlink transmission at the base station end, and predefining and/or configuring by using signaling a relationship between a downlink transmission detection result received by the user equipment and the subcarrier spacing of the preamble signal. The user equipment determines the subcarrier spacing of the preamble signal based on the downlink transmission detection result received by the user equipment and the relationship between the received downlink transmission detection result and the subcarrier spacing of the preamble signal. That the base station end performs the downlink transmission includes that the base station end transmits the reference signal. The downlink transmission detection result includes a largest RSRP value measured. For example, the base station performs downlink transmission, and sends a signal and/or a channel, and the user measures a received reference signal, to obtain the largest RSRP value. The user determines, based on a correspondence between the largest RSRP measurement value and the subcarrier spacing of the preamble signal that is predefined or configured by the base station by using signaling, the subcarrier spacing used by the preamble signal. For example, the correspondence between the highest RSRP measurement value and the subcarrier spacing of the preamble signal is configured as shown in Table 6.

TABLE 6

| Largest RSRP measurement value (dBm) | Subcarrier spacing of preamble signal |
|---|---|
| RSRP <−140 | 60 KHz |
| −92 > RSRP ≥ −140 | 120 KHz |
| −44 > RSRP ≥ −92 | 240 KHz |
| RSRP ≥−44 | 480 KHz |

For example, in the foregoing table, when the user receives downlink transmission, the user measures the downlink transmission, and obtains that the largest RSRP value of the downlink transmission satisfies −44>RSRP≥−92. In this case, the user uses the 240 KHz subcarrier spacing to send the preamble signal.

Optionally, in this embodiment of the present invention, the setting the subcarrier spacing that is used when sending is performed by using the physical layer random access channel includes performing downlink transmission at the base station end, and predefining and/or configuring by using signaling a relationship between a downlink transmission detection result received by the user equipment and the subcarrier spacing of the preamble signal. The user equipment determines the subcarrier spacing of the preamble signal based on the downlink transmission detection result received by the user equipment and the relationship between the received downlink transmission detection result and the subcarrier spacing of the preamble signal. That the base station end performs the downlink transmission includes that the base station end transmits a signal and/or a channel. The downlink transmission detection result includes an optimal beam sequence number detected. For example, the base station performs downlink transmission, and sends a signal and/or a channel, and the user detects a received signal and/or channel, to obtain the optimal beam sequence number. The user determines, based on a correspondence between the optimal beam sequence number and the subcarrier spacing of the preamble signal that is predefined or configured by the base station by using signaling, the subcarrier spacing used by the preamble signal. For example, the correspondence between the optimal beam sequence number and the subcarrier spacing of the preamble signal is configured as shown in Table 7.

TABLE 7

| Optimal beam sequence number | Subcarrier spacing of preamble signal |
|---|---|
| 0-3 | 60 KHz |
| 4-7 | 120 KHz |
| 8-11 | 240 KHz |
| 12-15 | 480 KHz |

For example, in the foregoing table, when the user receives downlink transmission, the user detects the downlink transmission, and obtains that the optimal beam sequence number of the downlink transmission satisfies 8≥optimal beam sequence number≥11. In this case, the user uses the 240 KHz subcarrier spacing to send the preamble signal.

In this embodiment of the present invention, a maximum quantity of RBs and a minimum quantity of RBs supported by each subcarrier spacing are configured, thereby defining a maximum bandwidth corresponding to each subcarrier spacing. For example, each RB includes 12 subcarrier spacings. If a minimum quantity of RBs supported by the 15 KHz subcarrier spacing is defined as 6, and a supported maximum quantity of RBs is defined as 110, a transmission bandwidth that can be actually used for 15 KHz is defined to range from 15 KHz*12*6=1.08 MHz to 15 KHz*12*110=19.8 MHz. If a minimum quantity of RBs supported by the 30 KHz subcarrier spacing is defined as 6, and a supported maximum quantity of RBs is defined as 110, a transmission bandwidth that can be actually used for 30 KHz is defined to range from 30 KHz*12*6=2.16 MHz to 30 KHz*12*110=39.6 MHz.

Figure 11A:
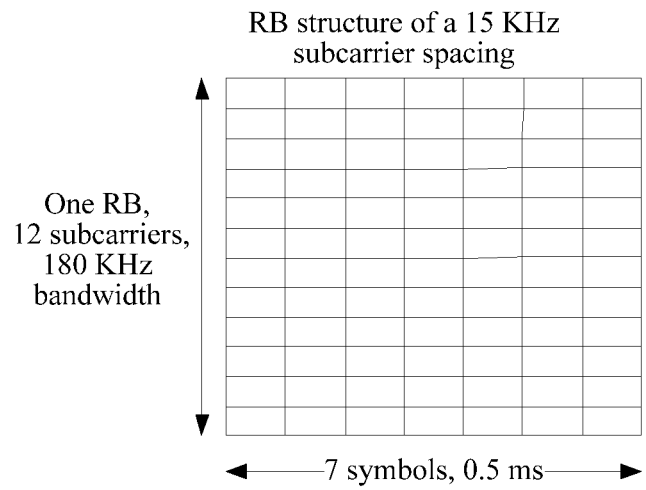
FIG. 11(*a*) is a schematic diagram of a resource block structure of a subcarrier spacing according to an embodiment of the present invention.
Figure 11B:
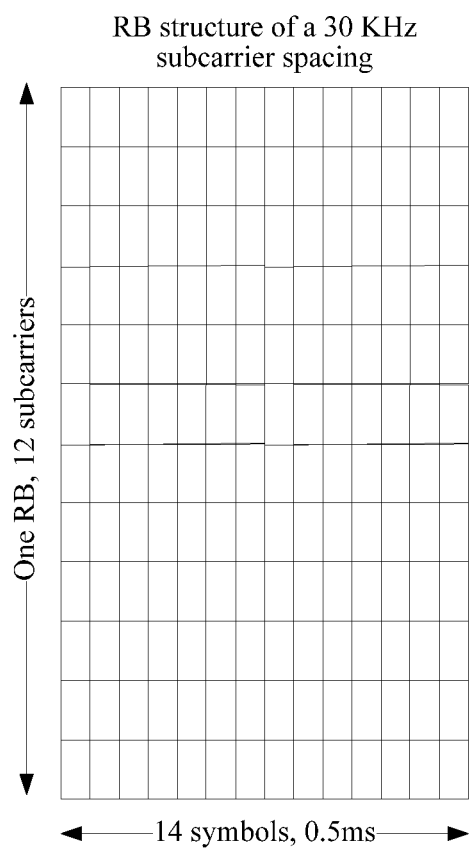

For another example, as shown in FIG. 11(a), if a bandwidth of one RB is defined as 180 KHz, for 15 KHz, each RB includes 12 subcarriers. If a minimum quantity of RBs supported by the 15 KHz subcarrier spacing is defined as 6, and a supported maximum quantity of RBs is defined as 110, a transmission bandwidth that can be actually used for 15 KHz is defined to range from 15 KHz*12*6=1.08 MHz to 15 KHz*12*110=19.8 MHz. For 30 KHz, each RB includes 6 subcarriers. If a minimum quantity of RBs supported by the 30 KHz subcarrier spacing is defined as 12, and a supported maximum quantity of RBs is defined as 220, a transmission bandwidth that can be actually used for 30 KHz is defined to range from 30 KHz*6*12=1.08 MHz to 30 KHz*6*220=19.8 MHz, as shown in FIG. 1(b).

Figure 12:
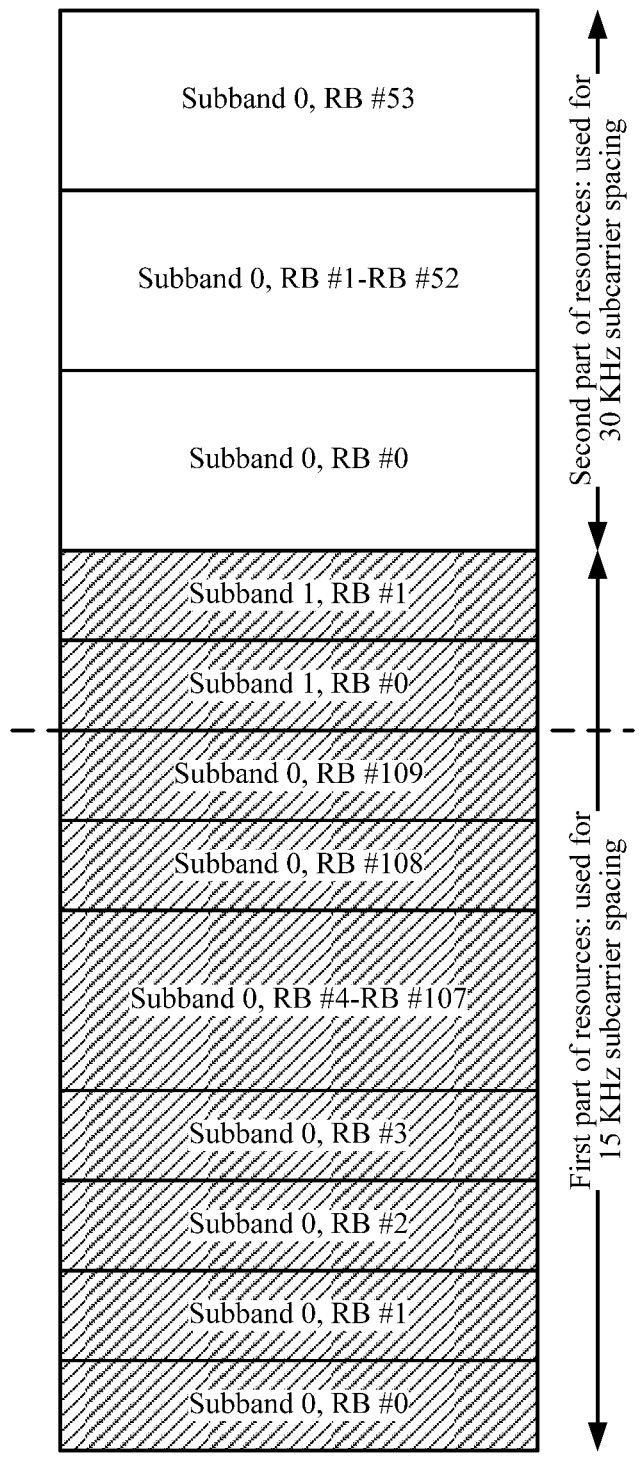
FIG. 12 is a schematic diagram of resource block numbers according to an embodiment of the present invention.

In this embodiment of the present invention, numbers of resource blocks when different subcarrier spacings coexist are configured or determined. The number of the resource block includes a number of the RB and/or a number of a subband in which the RB is located in. For example, in this embodiment of the present invention, when a plurality of subcarrier spacings are frequency division multiplexed on a carrier, resource blocks (RB) corresponding to each subcarrier spacing are sequentially numbered in an accumulation manner starting from M on a resource part on which the RBs are located, where M may be an integer, such as 0. The resource part refers to a part of continuous resources on which a same subcarrier spacing is used to send data. The sequentially numbering in an accumulation manner means that on a resource part, a number of the first resource block is M, and a number of a remaining resource block is a number value of a previous resource block plus N modulo (a maximum number value of resource blocks corresponding to a subcarrier spacing corresponding to a current resource block +1), where N is an integer, such as 1. As shown in FIG. 12, for example, when a bandwidth is 40 MHz, a maximum RB number range value of the 15 KHz subcarrier spacing and the 300 KHz subcarrier spacing is 109. The 15 KHz subcarrier spacing is used to transmit data on a first part of resources, and the 300 KHz subcarrier spacing is used to transmit data on a second part of resources. On the first part of resources, RBs corresponding to the 15 KHz subcarrier spacing are sequentially numbered in an accumulation manner starting from 0, and on the second part of resources, RBs corresponding to the 300 KHz subcarrier spacing are sequentially numbered in an accumulation manner starting from 0.

Figure 13:
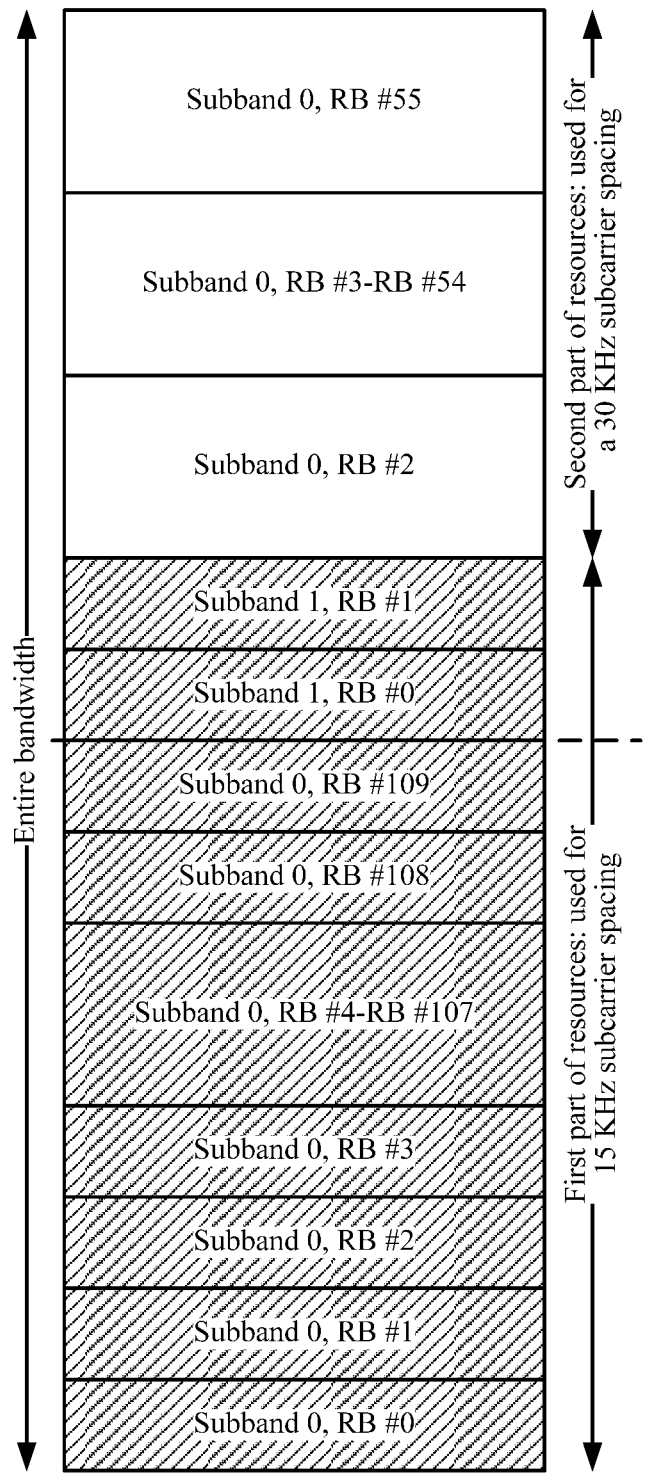
FIG. 13 is another schematic diagram of resource block numbers according to an embodiment of the present invention.

Alternatively, when a plurality of subcarrier spacings are frequency division multiplexed on one carrier, a number of a resource block (RBs) corresponding to each subcarrier spacing is obtained by sequentially accumulating number values of previous resource blocks. In other words, no matter a subcarrier spacing used by a current resource block and a previous resource block, a number of each resource block is obtained relative to a number of a previous resource block by sequential accumulating. The sequential accumulating refers to that on an entire bandwidth, a number of a first resource block is M, a number of a remaining resource block is a number value of a previous resource block plus N modulo (a maximum number value of resource blocks corresponding to the subcarrier spacing corresponding to the current resource block+1), where N is an integer, such as 1. As shown in FIG. 13, for example, when a bandwidth is 40 MHz, a maximum RB number range value of the 15 KHz subcarrier spacing and the 30 KHz subcarrier spacing is 109. The 15 KHz subcarrier spacing is used to transmit data on a first part of resources, and the 30 KHz subcarrier spacing is used to transmit data on a second part of resources. On the first part of resources, RBs corresponding to the 15 KHz subcarrier spacing are sequentially numbered in an accumulation manner starting from 0. On the second part of resources, a number of the first RB corresponding to the 30 KHz subcarrier spacing is 2 obtained in a number 1 of the last RB corresponding to the 15 KHz subcarrier spacing plus 1 modulo 110, and numbers of the remaining RBs corresponding to the 30 KHz subcarrier spacing are each obtained by sequentially accumulating a number of a previous RB.

Figure 14:
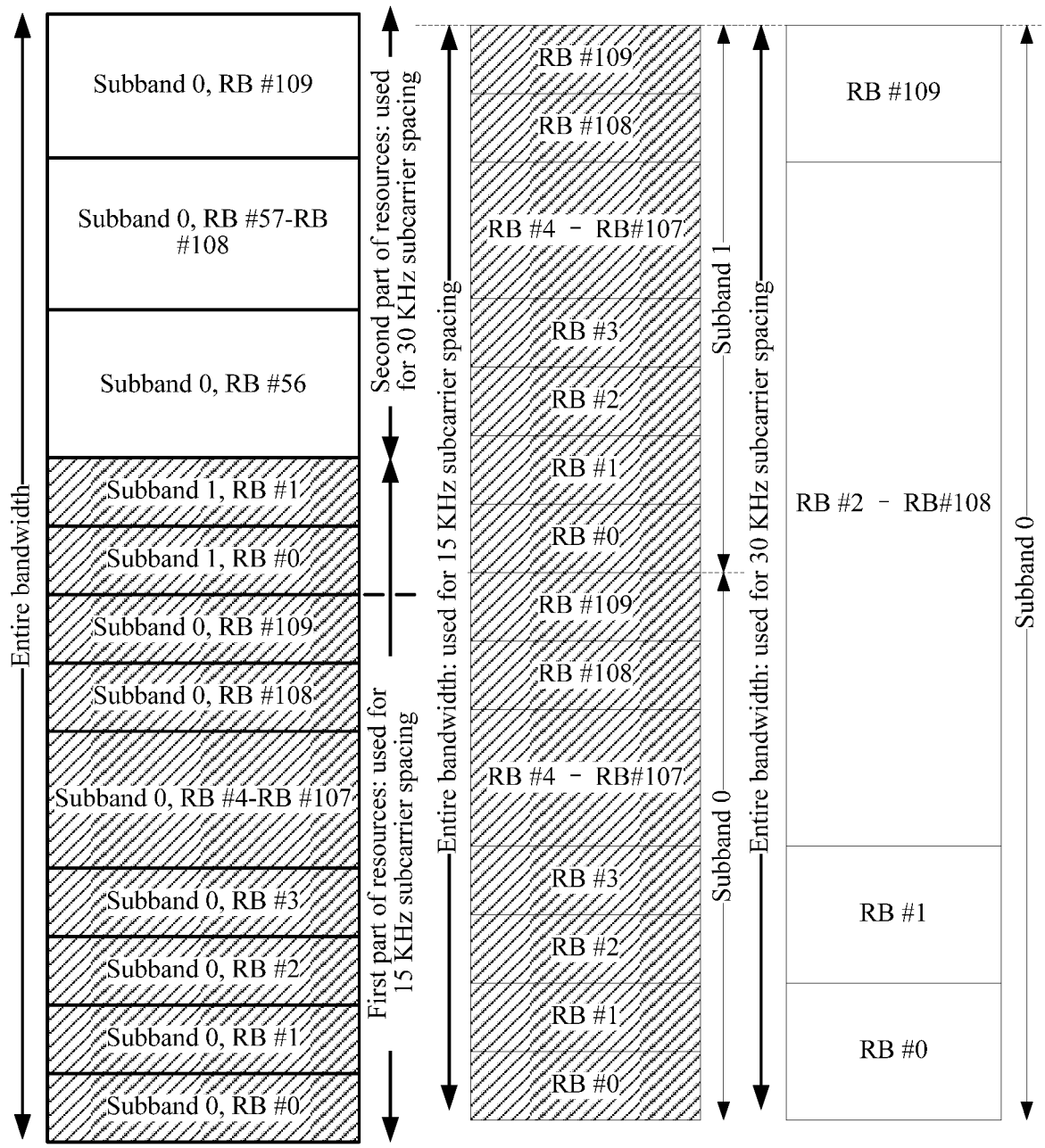
FIG. 14 is still another schematic diagram of resource block numbers according to an embodiment of the present invention.

Alternatively, numbers of resource blocks may be configured in such a manner that when a plurality of subcarrier spacings are frequency division multiplexed on a carrier, resource blocks corresponding to each subcarrier spacing are independently numbered. The resource blocks corresponding to each subcarrier spacing are independently numbered, to be specific, numbering of RBs and/or numbering of subbands corresponding to each carrier are not affected by numbering of other subcarrier spacings. A value of a number of each of resource blocks at identical locations on the plurality of subcarrier spacings is the same as that of a number of the resource block when only a subcarrier spacing on which the resource block is located exists on the entire bandwidth, and is not affected by coexisting of different subcarrier spacings, as shown in FIG. 14.

Optionally, in another embodiment of the present invention, the method may further include: configuring a precoding granularity of the physical channel in the multi-parameter system based on the subcarrier spacing and/or a carrier frequency. The precoding granularity is a resource unit used by a channel for precoding. To be specific, the channel uses a same precoding matrix in resource units including one precoding granularity. A precoding granularity corresponding to each subcarrier spacing may be configured as an integer quantity of resource blocks (RBs) corresponding to the subcarrier spacing.

In this embodiment of the present invention, the configuring a precoding granularity of a physical channel in the multi-parameter system based on the subcarrier spacing and/or a carrier frequency may include: predefining by the multi-parameter system or configuring by using signaling, the precoding granularity of the physical channel, where the signaling includes a broadcast message, a Media Access Control sublayer protocol (MAC layer) control element (CE, Control Element), or a physical layer control channel.

There is already an existing solution in LTE: In LTE, when a multiple-input multiple-output (MIMO) transmission technology is used, precoding is performed on data to be sent, so that an equivalent channel of the precoded data can better meet a requirement of MIMO. A precoding granularity is an integer quantity of resource blocks (Resource block, RB), to be specific, every integer quantity of RBs is used as a unit for precoding (that is, data in this bandwidth is multiplied by a precoding matrix), and different precoding granularities are configured for different system transmission bandwidths.

Figure 15:
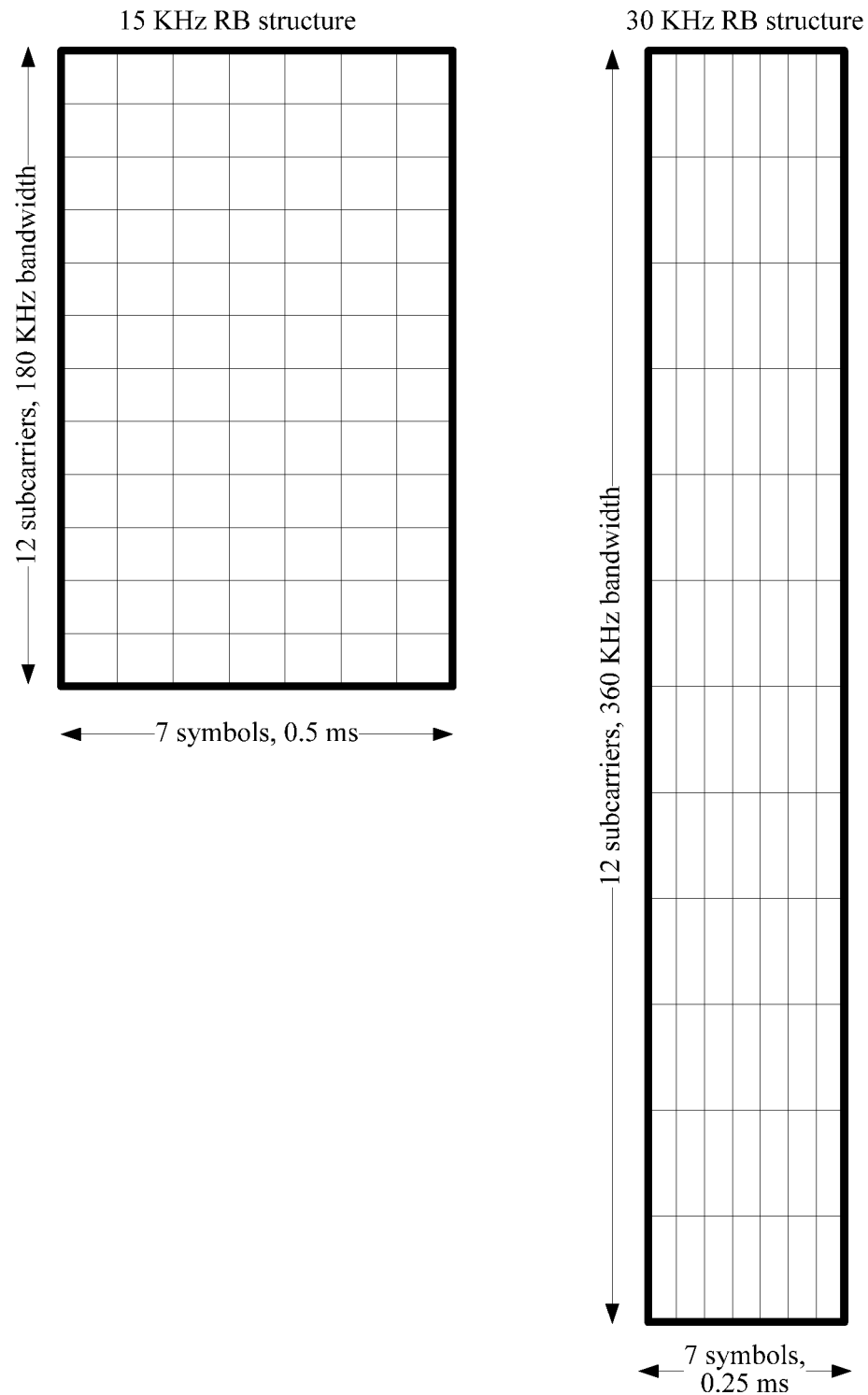
FIG. 15 is a schematic structural diagram of subcarrier spacings at a resource block granularity according to an embodiment of the present invention.

Since a plurality of subcarrier spacings are introduced into 5G, a definition of an RB corresponding to each type of subcarrier spacing may be different. For example, in LTE, when each RB includes 12 subcarriers, frequency domain widths and time domain widths that are of RBs and that correspond to the RBs of different subcarrier spacings are different. For example, a frequency domain width of one RB of the 15 KHz subcarrier spacing is 180 KHz, and a frequency domain width of one RB of the 300 KHz subcarrier spacing is 360 KHz. When the two subcarrier spacings are applied to a same channel environment, and the precoding granularity is two RBs, a frequency domain width of two RBs of the 15 KHz subcarrier spacing may be less than a coherence bandwidth of the channel, and a frequency domain width of two RBs of the 30 KHz subcarrier spacing may be greater than the coherence bandwidth of the channel (channel conditions in the coherence bandwidth are considered as consistent). Using one precoding parameter to perform precoding in an unsmooth bandwidth cannot reflect channel differences, and therefore the 300 KHz subcarrier spacing may cause performance degradation relative to the 15 KHz subcarrier spacing. Therefore, to eliminate performance degradation caused when different subcarrier spacings are applied to a same channel environment, in this embodiment of the present invention, different precoding granularities are configured for different subcarrier spacings. For example, a precoding granularity of the 15 KHz subcarrier spacing is two RBs, and a precoding granularity of the 300 KHz subcarrier spacing is one RB, as shown in FIG. 15.

It should be noted that the foregoing content describes some configurations of the synchronization signal, the reference signal, and the data channel. In this embodiment of the present invention, another channel or signal in the physical channel or physical signal may be further configured, to implement data transmission by coordinating a plurality of parameters in the multi-parameter system.

Figure 16:
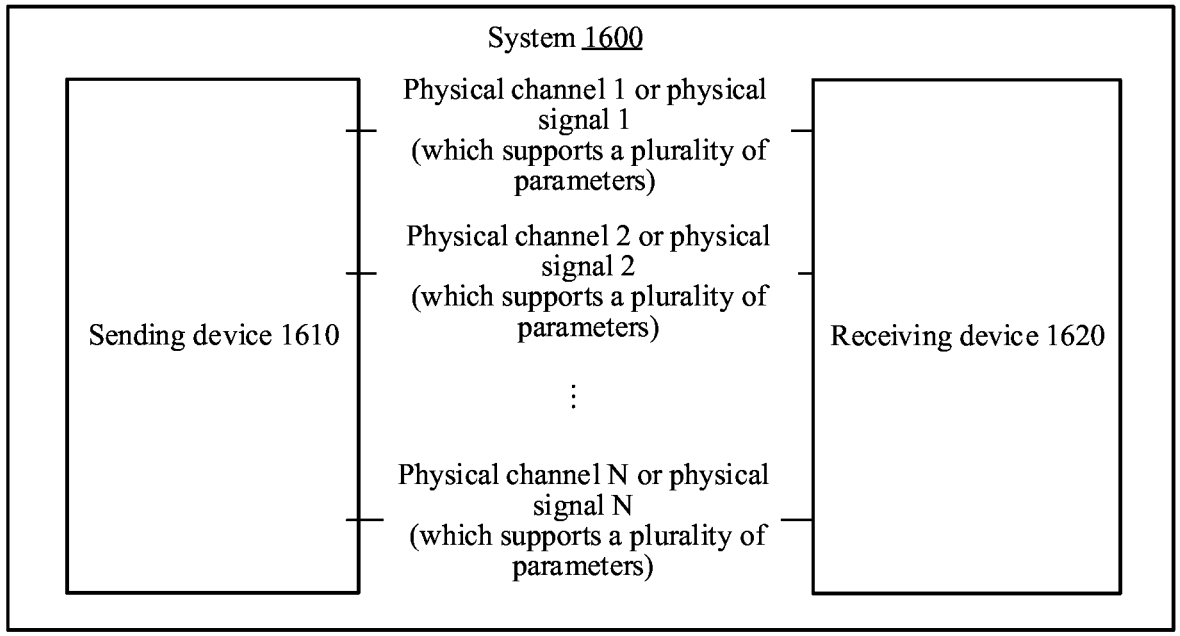
FIG. 16 is a schematic diagram of a system according to an embodiment of the present invention.

FIG. 16 shows a system according to an embodiment of the present invention. The system may support transmitting data by using a plurality of parameters, where the plurality of parameters may include information of parameters such as a subcarrier spacing (SC), a cyclic prefix (CP) length, a subframe length, and resource blocks (RB), used when data is transmitted. The multi-parameter can be applied to various physical channels or physical signals over which data is transmitted in a system, for example, a synchronization signal and a reference signal, or a data channel and a control channel.

As shown in FIG. 16, a system 1600 may include a sending device 1610 and a receiving device 1620.

The sending device 1610 and the receiving device 1620 may transmit data over a plurality of physical channels or a plurality of physical signals. Transmitting data by using a plurality of parameters may be supported on each physical channel or physical signal, improving flexibility of a multi-parameter system.

Figure 17:
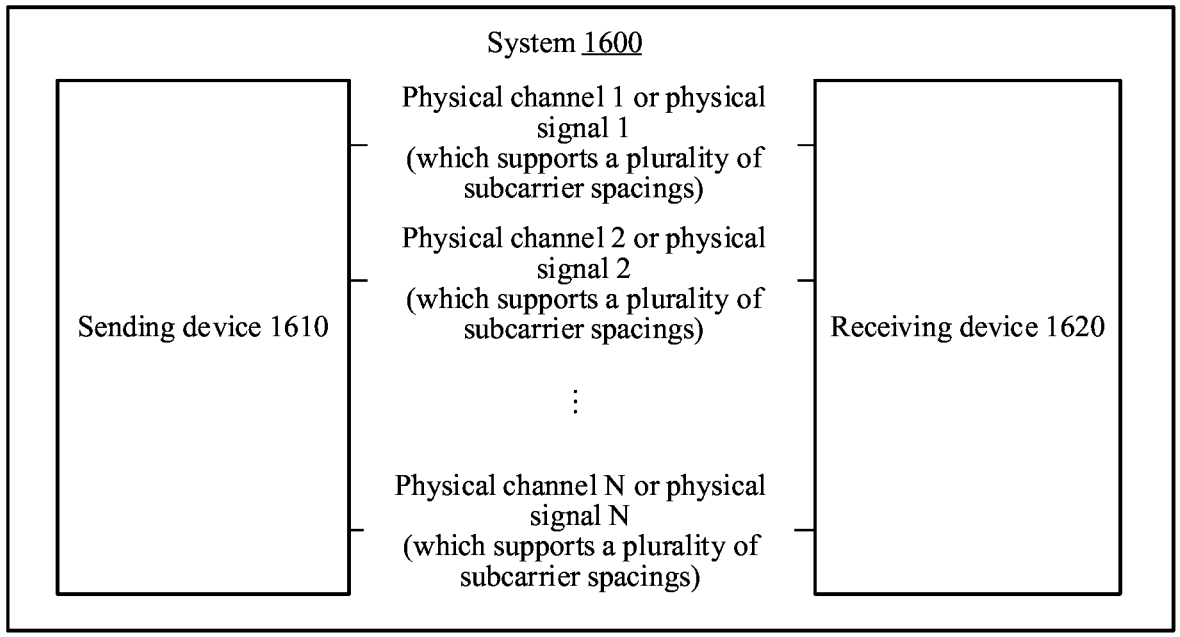
FIG. 17 is a schematic diagram of another system according to an embodiment of the present invention.

As shown in FIG. 17, this embodiment of the present invention is described by using one type of parameter, that is, a subcarrier spacing, as an example.

In this embodiment of the present invention, the system 1600 may support transmitting data by using a plurality of subcarrier spacings. Optionally, in this embodiment of the present invention, before transmitting data over a physical channel or a physical signal by using at least one subcarrier spacing, the sending device 1610 and the receiving device 1620 need to configure the physical channel or the physical signal first, configure the data to be transmitted over the physical channel or the physical signal, and configure a resource to which the data is mapped. In other words, the sending device 1610 and the receiving device 1620 determine the data used (or transmitted) by the physical channel or the physical signal in the multi-parameter system, and determine a resource to which the data of the physical channel or the physical signal in the multi-parameter system is mapped. In this embodiment of the present invention, the physical channel may include channels such as a data channel and a control channel; and the physical signal may include a synchronization signal and a reference signal, where the synchronization signal may be alternatively referred to as a synchronization channel, and the reference signal may be alternatively referred to as a pilot signal or a pilot channel. Data transmitted on the synchronization signal and the reference signal is a sequence, the sequence does not include data from a higher layer (for example, an RRC (Radio Resource Control) layer or a MAC (Medium Access Control) layer), and data transmitted on the physical channel (for example, a data channel or a control channel) is information from a higher layer. Therefore, the physical channel and the physical signal are differentiated. For example, the physical signal includes a synchronization signal and a reference signal, and the physical channel includes a data channel and a control channel.

Optionally, in this embodiment of the present invention, the configuring the physical signal in the multi-parameter system may include configuring a synchronization signal.

Optionally, in another embodiment of the present invention, the configuring a synchronization signal includes configuring at least one synchronization signal, and at least one subcarrier spacing used to send a first sequence over each synchronization signal.

Optionally, in another embodiment of the present invention, a quantity of the at least one synchronization signal is configured to be equal to a quantity of the at least one subcarrier spacing supported by the multi-parameter system, and each synchronization signal supports transmitting data by using one of the subcarrier spacings.

Optionally, in another embodiment of the present invention, the configuring a synchronization signal further includes configuring a quantity of the at least one synchronization signal to be less than a quantity of the at least one subcarrier spacing supported by the multi-parameter system, and each synchronization signal supports transmitting data by using the at least one subcarrier spacing.

Optionally, in another embodiment of the present invention, the at least one synchronization signal and the subcarrier spacing that is used when the first sequence is transmitted over each synchronization signal are configured based on a carrier frequency or a service type.

Optionally, in another embodiment of the present invention, the first sequence to be transmitted over the synchronization signal is configured.

Optionally, in another embodiment of the present invention, that the first sequence to be transmitted over the synchronization signal is configured includes determining the first sequence based on one or more types of information: an identifier of the synchronization signal, the subcarrier spacing, or a carrier frequency.

Optionally, in another embodiment of the present invention, a frequency domain location and a time domain location to which the first sequence is mapped is configured.

Optionally, in another embodiment of the present invention, a plurality of frequency domain locations and time domain locations to which the first sequence is mapped are determined based on one or more types of information: an identifier of the synchronization signal, the subcarrier spacing, or a carrier frequency.

Optionally, in another embodiment of the present invention, the frequency domain location includes a resource block location and a subcarrier location to which the first sequence is mapped when the first sequence is transmitted over the synchronization signal by using the at least one subcarrier spacing; and a time domain location includes a time unit to which the first sequence is mapped when the first sequence is transmitted over the synchronization signal by using the at least one subcarrier spacing, where the time unit includes a first time unit, a second time unit, and a third time unit.

Optionally, in another embodiment of the present invention, a mapping relationship between the time unit to which the synchronization signal is mapped and the synchronization signal and a mapping relationship between the resource block location to which the synchronization signal is mapped and the synchronization signal are configured.

Optionally, in another embodiment of the present invention, the reference signal in the multi-parameter system is configured.

Optionally, in another embodiment of the present invention, a second sequence is configured based on the subcarrier spacing, and the second sequence is a sequence transmitted over the reference signal by using the at least one subcarrier spacing.

Optionally, in another embodiment of the present invention, the precoding granularity of the physical channel in the multi-parameter system is configured based on the subcarrier spacing or a carrier frequency.

Optionally, in another embodiment of the present invention, that the precoding granularity of the physical channel in the multi-parameter system is configured based on the subcarrier spacing or a carrier frequency includes predefining, by using the multi-parameter system, or configuring, by using signaling, the precoding granularity of the physical channel, where the signaling includes a broadcast message, a Media Access Control sublayer protocol, or a physical layer control channel.

It should be noted that a configuration process for the system is the same as the configuration process provided in FIG. 1 to FIG. 14. For brief descriptions, details are not described herein again.

It should be further noted that the configuration for the foregoing system is described by using configuration of a synchronization signal in the physical signal as an example. In this embodiment of the present invention, another physical channel (for example, a data channel or a control signal) or physical signal (a reference signal) in the system may be further configured. This is not limited in this embodiment of the present invention.

A person skilled in the art may be further aware that, in combination with the examples described in the embodiments disclosed in this specification, steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method comprising:
configuring a physical channel or a physical signal in a multi-parameter system, the configuring comprising at least configuring a relative subcarrier spacing that is used when a reference signal is sent, wherein the relative subcarrier spacing is determined according to a relationship between a baseline subcarrier spacing of a data channel and a subcarrier spacing of the reference signal; and
transmitting, by a device in the multi-parameter system, data over the physical channel or the physical signal using more than one subcarrier spacing for a first subcarrier frequency of the physical channel or physical signal, wherein a plurality of parameters of the multi-parameter system comprises a subcarrier spacing, and wherein the multi-parameter system supports downlink data transmissions using a plurality of different subcarrier spacings, the plurality of different subcarrier spacings comprises a first subcarrier spacing for first downlink transmissions and a second subcarrier spacing for second downlink transmissions, and the first subcarrier spacing is different than the second subcarrier spacing.

2. The method according to claim 1, wherein before transmitting, by the device in the multi-parameter system, data over the physical channel or the physical signal using the more than one subcarrier spacing, the method further comprises:
configuring the data transmitted over the physical channel or the physical signal; and
configuring a resource to which the data is mapped.

3. The method according to claim 2, wherein configuring the data transmitted over the physical signal comprises:
determining a first sequence transmitted over a synchronization signal.

4. The method according to claim 3, wherein determining the first sequence transmitted over the synchronization signal comprises:
determining the first sequence according to an identifier of the synchronization signal, the more than one subcarrier spacing, or a carrier frequency.

5. The method according to claim 4, wherein configuring the resource to which the data is mapped comprises:
determining a location of a resource to which the first sequence is mapped.

6. The method according to claim 5, wherein determining the location of the resource to which the first sequence is mapped comprises:
determining, according to the identifier of the synchronization signal, the more than one subcarrier spacing, or the carrier frequency, at least one of a plurality of optional locations to which the first sequence is mapped.

7. The method according to claim 6, wherein:
a frequency domain location comprises a resource block location and a subcarrier location to which the first sequence is mapped when the first sequence is transmitted over the synchronization signal using the more than one subcarrier spacing; and
a time domain location comprises a time unit to which the first sequence is mapped when the first sequence is transmitted over the synchronization signal using the more than one subcarrier spacing, wherein the time unit comprises a first time unit, a second time unit, and a third time unit.

8. The method according to claim 7, further comprising configuring:
a first mapping relationship between the time unit to which the synchronization signal is mapped and the synchronization signal;
a second mapping relationship between the resource block location to which the synchronization signal is mapped and the synchronization signal; and
a third mapping relationship between a subcarrier spacing location to which the synchronization signal is mapped and the synchronization signal.

9. The method according to claim 2, wherein configuring the physical signal in the multi-parameter system comprises configuring the reference signal in the multi-parameter system.

10. The method according to claim 9, wherein a second sequence is configured according to the subcarrier spacing, wherein the second sequence is a sequence transmitted over the reference signal using the more than one subcarrier spacing.

11. The method according to claim 1, wherein configuring the physical signal in the multi-parameter system comprises configuring at least one synchronization signal, wherein each of the at least one synchronization signal indicates a respective one of the plurality of different subcarrier spacings for downlink data transmissions.

12. The method according to claim 11, wherein configuring the synchronization signal comprises configuring at least one subcarrier spacing used when a first sequence is transmitted over each of the at least one synchronization signal.

13. The method according to claim 12, wherein the at least one synchronization signal and the subcarrier spacing used when the first sequence is transmitted over each of the at least one synchronization signal are configured according to a carrier frequency or a service type.

14. The method according to claim 12, wherein a quantity of the at least one synchronization signal is configured to be equal to a quantity of the plurality of different subcarrier spacings supported by the multi-parameter system, wherein each of the at least one synchronization signal supports transmitting data using one of the plurality of different subcarrier spacings, wherein a first synchronization signal of the at least one synchronization signal supports transmitting data using the first subcarrier spacing, and wherein a second synchronization signal of the at least one synchronization signal supports transmitting data using the second subcarrier spacing, the second synchronization signal is different from the first synchronization signal.

15. The method according to claim 12, wherein the configuring the synchronization signal further comprises:
configuring a quantity of the at least one synchronization signal to be less than a quantity of the plurality of different subcarrier spacings supported by the multi-parameter system, wherein a first synchronization signal of the at least one synchronization signal supports transmitting data using both the first subcarrier spacing and the second subcarrier spacing.

16. The method according to claim 1, wherein the method further comprises:
configuring a precoding granularity of the physical channel in the multi-parameter system according to the more than one subcarrier spacing or a carrier frequency.

17. The method according to claim 16, wherein configuring the precoding granularity of the physical channel in the multi-parameter system according to the more than one subcarrier spacing or the carrier frequency comprises:
predefining, using the multi-parameter system, the precoding granularity of the physical channel; or
configuring, using signaling, the precoding granularity of the physical channel, wherein the signaling comprises a broadcast message, a Media Access Control element, or a physical layer control channel.

18. A system, comprising:
a sending device; and
a receiving device;
wherein the sending device and the receiving device implement a method including:
configuring a physical channel or a physical signal in a multi-parameter system, the configuring comprising at least configuring a relative subcarrier spacing that is used when a reference signal is sent, wherein the relative subcarrier spacing is determined according to a relationship between a baseline subcarrier spacing of a data channel and a subcarrier spacing of the reference signal; and
transmitting data over the physical channel or the physical signal using more than one subcarrier spacing for a first subcarrier frequency of the physical channel or physical signal, wherein a plurality of parameters of the system comprises a subcarrier spacing, and wherein the system supports downlink data transmissions using a plurality of different subcarrier spacings, the plurality of different subcarrier spacings comprises a first subcarrier spacing for first downlink transmissions and a second subcarrier spacing for second downlink transmissions, and the first subcarrier spacing is different than the second subcarrier spacing.

19. The system according to claim 18, wherein the sending device is configured to transmit data over the physical channel or the physical signal using the more than one subcarrier spacing, and wherein transmitting the data over the physical channel or the physical signal using the more than one subcarrier comprises:
configuring the data transmitted over the physical channel or the physical signal; and
configuring a resource to which the data is mapped.

20. The system according to claim 18, wherein configuring the physical signal in the multi-parameter system comprises configuring the reference signal in the multi-parameter system.

* * * * *